United States Patent
Chan et al.

(10) Patent No.: US 10,534,851 B1
(45) Date of Patent: Jan. 14, 2020

(54) DYNAMIC LANDING PAGES

(71) Applicant: BloomReach Inc., Mountain View, CA (US)

(72) Inventors: Kevin C. Chan, Santa Clara, CA (US); Mohit Gupta, Cupertino, CA (US); Viksit Gaur, San Francisco, CA (US); Gaurav Bhati, Bangalore (IN); Ashutosh Garg, Sunnyvale, CA (US)

(73) Assignee: BloomReach Inc., Mountain View, CA (US)

( * ) Notice: Subject to any disclaimer, the term of this patent is extended or adjusted under 35 U.S.C. 154(b) by 133 days.

(21) Appl. No.: 14/621,208

(22) Filed: Feb. 12, 2015

Related U.S. Application Data

(60) Provisional application No. 62/094,887, filed on Dec. 19, 2014.

(51) Int. Cl.
  *G06F 17/22* (2006.01)
  *G06Q 30/02* (2012.01)
  *G06F 16/951* (2019.01)

(52) U.S. Cl.
  CPC ........ *G06F 17/2247* (2013.01); *G06F 16/951* (2019.01); *G06Q 30/0255* (2013.01)

(58) Field of Classification Search
  None
  See application file for complete search history.

(56) References Cited

U.S. PATENT DOCUMENTS

| | | | |
|---|---|---|---|
| 5,894,554 A | 4/1999 | Lowery et al. | |
| 6,990,653 B1 | 1/2006 | Burd et al. | |
| 7,096,418 B1 | 8/2006 | Singhal et al. | |
| 7,275,114 B2 | 9/2007 | Allen et al. | |
| 7,316,003 B1 | 1/2008 | Dulepet et al. | |
| 7,386,786 B2 | 6/2008 | Davis et al. | |
| 7,398,463 B2 | 7/2008 | Bernstein et al. | |
| 7,437,663 B2 | 10/2008 | Lakhdhir et al. | |
| 7,536,389 B1 | 5/2009 | Prabhakar et al. | |
| 7,797,432 B2 | 9/2010 | Volodarsky et al. | |
| 7,818,399 B1 | 10/2010 | Ross, Jr. et al. | |

(Continued)

FOREIGN PATENT DOCUMENTS

| | | |
|---|---|---|
| EP | 1156429 | 11/2001 |
| WO | 2001088762 | 11/2001 |

OTHER PUBLICATIONS

Amza et al., Specification and Implementation of Dynamic Web Site Benchmarks, Workload Characterization, 2002. WWC-5. 2002 IEEE International Workshop on. IEEE, 2002.

Challenger et al., A Scalable System of Consistently Caching Dynamic Web Data, IEEE, 1999.

Challenger et al., A Publishing System for Efficiently Creating Dynamic Web Content, INFOCOM 2000. Nineteenth Annual Joint Conference of the IEEE Computer and Communications Societies. Proceedings. IEEE. vol. 2. IEEE, 2000.

(Continued)

*Primary Examiner* — Alexandru Cimu
(74) *Attorney, Agent, or Firm* — Moser Taboada

(57) ABSTRACT

Techniques for dynamic landing pages are disclosed. In some embodiments, a process for providing dynamic landing pages includes selecting a dynamic landing page in response to a request for a Uniform Resource Indicator (URI) (e.g., destination URI) of a web site using a dynamic selector engine; and returning the dynamic landing page using a proxy service. For example, the dynamic landing page can correspond to a web page that is returned in response to the request for the destination URI, and the web page can include customized content (e.g., including a widget) that is targeted for a campaign, channel, source, and/or user.

23 Claims, 24 Drawing Sheets

(56) References Cited

U.S. PATENT DOCUMENTS

| | | | |
|---|---|---|---|
| 8,166,054 | B2 | 4/2012 | Fu et al. |
| 8,225,196 | B2 | 7/2012 | Ramakrishna et al. |
| 8,230,053 | B2 | 7/2012 | Allen et al. |
| 8,539,330 | B2 | 9/2013 | Dovin et al. |
| 8,606,652 | B2 | 12/2013 | Gonsalves |
| 9,390,180 | B1 * | 7/2016 | Snyder .............. G06F 17/30867 |
| 2005/0076097 | A1 | 4/2005 | Sullivan et al. |
| 2005/0102611 | A1 | 5/2005 | Chen |
| 2008/0133722 | A1 | 6/2008 | Ramasundaram et al. |
| 2008/0282176 | A1 | 11/2008 | Bates et al. |
| 2009/0171754 | A1 * | 7/2009 | Kane ................. G06F 17/30867 705/14.53 |
| 2009/0192783 | A1 | 7/2009 | Jurach, Jr. et al. |
| 2011/0054960 | A1 | 3/2011 | Bhatia et al. |
| 2011/0307517 | A1 | 12/2011 | Ntoulas |

OTHER PUBLICATIONS

Jim Conallen, Modeling Web Application Architectures with UML, Rational Software White Papers, Jun. 1999.

Maximilien et al., A Framework and Ontology for Dynamic Web Services Selection, IEEE, Sep./Oct. 2004.

Macias et al., Dynamic Web Page Authoring by Example Using Ontology-Based Domain Knowledge, Jan. 12-15, 2003.

Artzi et al., Computer Science and Artificial Intelligence Laboratory Technical Report, Finding Bugs in Dynamic Web Applications, Feb. 6, 2008.

Oney et al., FireCystal: Understanding Interactive Behaviors in Dynamic Web Pages, IEEE, 2009.

* cited by examiner

FIG. 23

DYNAMIC LANDING PAGES

CROSS REFERENCE TO OTHER APPLICATIONS

This application claims priority to U.S. Provisional Patent Application No. 62/094,887, entitled DYNAMIC LANDING PAGES, filed Dec. 19, 2014, which is incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Internet-based web services can be delivered through web sites on the World Wide Web. Web pages are often formatted using HyperText Markup Language (HTML), eXtensible HTML (XHTML), or using another language that can be processed by a web browser that is typically executed on a user's client device, such as a computer, tablet, phablet, smart phone, smart watch, smart television, or other (client) device. A web site can be hosted on a web server (e.g., a web server or appliance) that is typically accessible via a network, such as the Internet, through a web address, which is generally known as a Uniform Resource Indicator (URI) or a Uniform Resource Locator (URL).

Search engines can be used to facilitate searching of web services, such as to identify relevant web sites for particular online content and/or services on the World Wide Web. Search engines (e.g., web-based search engines provided by various vendors, including, for example, Google®, Microsoft Bing®, and Yahoo®) provide for searches of online information that includes searchable content (e.g., digitally stored electronic data), such as searchable content available via the World Wide Web. As input, a search engine typically receives a search query (e.g., query input including one or more terms, such as keywords, by a user of the search engine). The search engine performs the search for the search query and outputs results that are typically presented in a ranked list, often referred to as search results or hits (e.g., links or URIs/URLs for one or more web pages and/or web sites). The search results can include web pages, images, audio, video, database results, directory results, information, and other types of data.

Search engines typically provide paid search results (e.g., the first set of results in the main listing and/or results often presented in a separate listing on, for example, the right side of the output screen). For example, advertisers may pay for placement in such paid search results based on keywords (e.g., keywords in search queries). Search engines also typically provide organic search results, also referred to as natural search results. Organic search results are generally based on various search algorithms employed by different search engines that attempt to provide relevant search results based on a received search query.

For improved Internet marketing, search engine optimization (SEO) has developed as a form of industry/technical consulting (e.g., often referred to as search engine optimizers) provided to web site operators (e.g., vendors of products/services with web sites and/or e-commerce vendors of products/services) for improving the volume or quality of traffic to a web site from a search engine via organic search results (e.g., to improve the web site's web presence as a paid service engagement or pursuant to a marketing campaign). Generally, the higher a web site appears in the organic search results list, the more users it will receive from the search engine. SEO can target different kinds of search, including image search, local search, and industry specific, vertical search engines to improve the web site's web presence. For example, SEO often considers how search engines work and what people search for to recommend web site related changes to optimize a web site (e.g., which primarily involves editing its content and HTML coding to both increase its relevance to specific keywords and to remove barriers to the indexing activities of search engines).

BRIEF DESCRIPTION OF THE DRAWINGS

Various embodiments of the invention are disclosed in the following detailed description and the accompanying drawings.

FIG. 23 illustrates an embodiment of a screen shot that provides opportunities for configuring a dynamic landing page to improve an existing online ad campaign.

DETAILED DESCRIPTION

Figure 1:
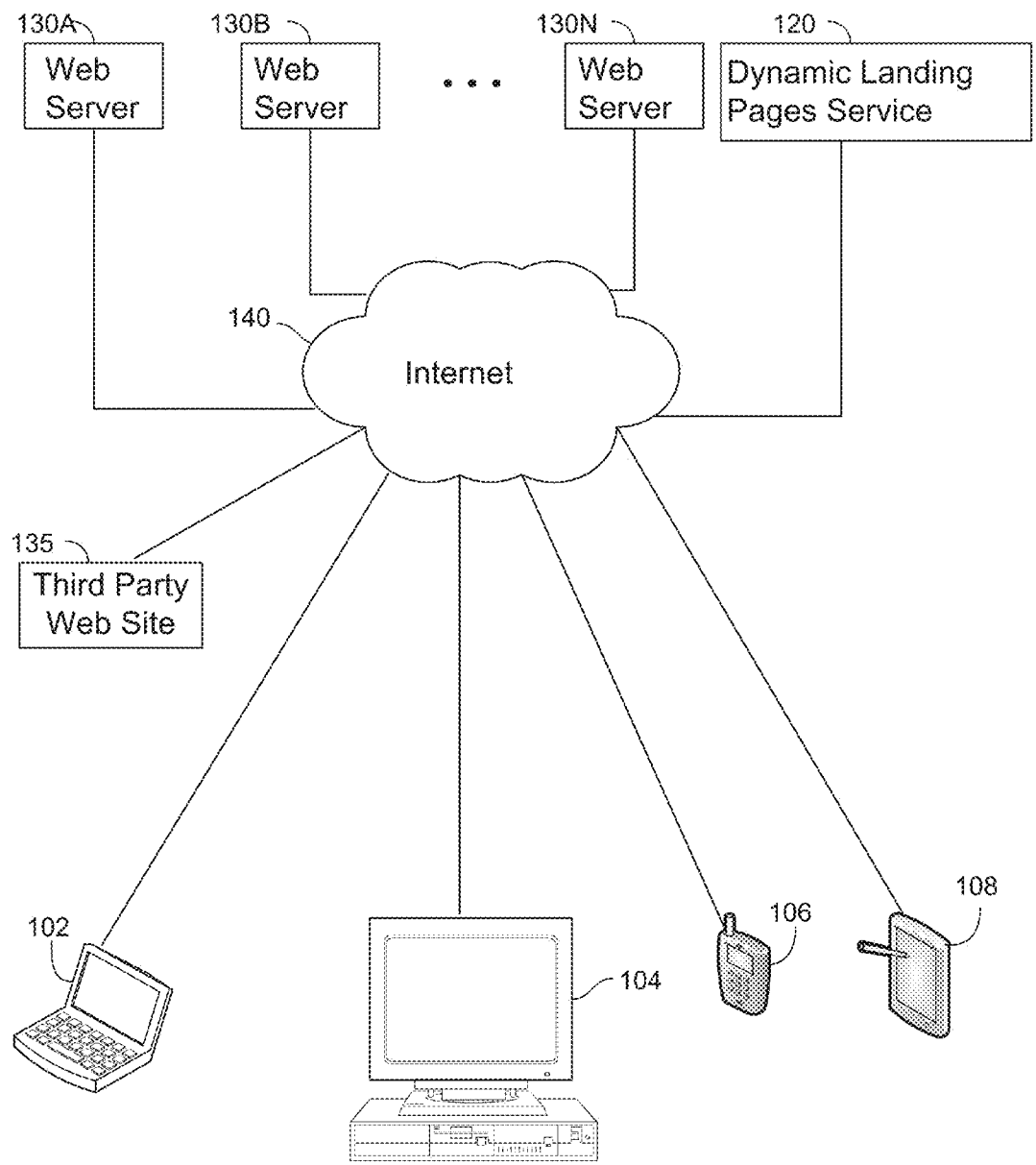
FIG. 1 is a block diagram illustrating a dynamic landing pages service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internet-based web services can be delivered through web sites on the World Wide Web (WWW). Web pages are often formatted using HyperText Markup Language (HTML), eXtensible HTML (XHTML), or using another markup and/or programming language that can be processed by a web browser that is typically executed on a user's client device, such as a computer, tablet, phablet, smart phone, smart watch, smart television, or other (client) device (e.g., a user computing device). A web site can be hosted on a server (e.g., a web server/appliance and/or an application server/appliance) that is typically accessible via a network, such as the Internet, through a web address, which is generally known as a Uniform Resource Indicator (URI) or a Uniform Resource Locator (URL).

Web sites can generally be classified as static web sites or interactive web sites. Static web sites and interactive web sites are generally described below.

Static web sites generally include static web content. For example, a web site can include one or more static web pages stored on a web server. Such static web pages are basically delivered to a client web browser in the same format that such web pages are stored on the web server (e.g., the same content is presented to each user that navigates to that particular static web page, which provides a consistent presentation of the static content on that web page to each of the different users/visitors of that web page). Static web pages are typically coded in a markup language, such as HTML, and style sheets, such as Cascading Style Sheets (CSS), are also often used to control the appearance or style of such basic HTML web pages. Static content on a static web site is typically manually updated. For example, a web page editor or other tools can be used by a web site owner to edit the static content on a web page (e.g., editing, adding, or deleting text, photos, and/or other content on the web page).

Interactive web sites (e.g., also referred to as dynamic web sites) generally include dynamic web content (e.g., typically dynamic content can be included along with or in addition to various static content on a web site). Specifically, an interactive or dynamic web site generally includes one or more dynamic web pages (e.g., web pages with dynamic content, such as by providing one or more dynamic elements on a web page). In some cases, a dynamic web page can refer to a web page that can change or customize automatically (e.g., to change over time and/or to present different content to different users to personalize web content for different users, etc.). For example, a dynamic web page can be provided using client-side dynamic web pages that are coded, for example, using JavaScript (e.g., or another programming/scripting language, such as Java, Python, and/or other general programming languages) to implement a dynamic web page (e.g., a dynamic HTML web page) that provides instructions to a user's web browser on how to interactively modify content of the web page (e.g., to personalize the content of the web page for a given user or provide other dynamic content for the web page). As another example, dynamic web pages can also be provided using server-side dynamic web pages that are generated automatically (e.g., on the fly) by computer code executed on a server (e.g., a web server or application server) to provide, for example, the HTML and CSS for the dynamically generated content for the web page. Dynamic web pages can generally be implemented using various software platforms/tools (e.g., Java Server Pages, Active Server Pages, HTML forms, and/or other software platforms/tools) and/or using various web application frameworks and web template systems that use general programming languages (e.g., Java, Python, and/or other general programming languages) to facilitate the implementation of dynamic web content for interactive or dynamic web sites.

An e-commerce web site generally refers to a web site that allows users to purchase products or services through the web site. E-commerce web sites often include both static and dynamic content on their web sites.

A merchant as used herein generally refers to a third party entity that uses a web site (e.g., on the World Wide Web (WWW)) to engage with customers and/or to buy and sell products and/or services. A merchant web site as used herein generally refers to a web site, such as an e-commerce web site, provided by/for the merchant that facilitates the merchant's online WWW presence to engage with customers and/or to buy and sell products and/or services (e.g., for performing e-commerce on the WWW, such as an e-commerce site that offers products/services for sale, an online news web site that presents news content as an online/web service, and/or a social networking site that provides social networking as an online/web service). Merchant web sites often include both static and dynamic content on their web sites.

Web sites, such as merchant web sites or e-commerce web sites, can include a variety of different static and/or dynamic web page content. The quality of such web content is important to provide an effective web site for users and, therefore, an effective online WWW presence for merchants using e-commerce/merchant web sites to interact with customers and/or potential customers. For example, a merchant web site should generally provide access to content in a manner that is effectively presented to users and facilitates user access and navigation on the merchant web site.

Web sites (e.g., web applications and/or various other web services delivered through web sites) generally store and display content (e.g., products or services related content in the case of a retailer, such as an e-commerce site; various informational related content in the case of a publisher, such as an online news or online magazine site; and/or various other content for other types of merchant sites). For example, this content can be accessed by a user in two primary ways: (1) an internal site search approach; and (2) a non-search approach (e.g., browse and/or site navigation).

Merchants often use online advertisements (ads) to direct online users to the merchant's web site. In some cases, the online ad can be a keyword ad campaign that is presented to users in response to a particular search (e.g., based on one or more keywords in the search) when users enter a keyword search using an online search engine, such as Google®, Yahoo®, Bing®, or another online search engine. In other cases, the online ad can be placed on one or more other web sites, such as an online news web site, social networking web site, and/or other web site. In yet other cases, the online ad can be placed in a promotional electronic communication (e.g., electronic mail (email), SMS/text message, or other electronic communication). The online ad will generally include a URI/URL (e.g., destination URI/URL), such that when a user clicks on the online ad (e.g., clicks on the embedded link of the online ad), the user's browser is directed to the web page associated with the URI/URL. In particular, the web page associated with the URI/URL that is associated with the online ad is typically an existing web page of the merchant web site. For example, the existing web page of the merchant web site can be a home page of the merchant web site, a category page of the merchant web site (e.g., for a particular category of products/services available for sale on the merchant web site), or another existing web page of the merchant web site.

Merchants can invest in online ads as part of an online marketing campaign to drive traffic to a merchant web site. In particular, a merchant can invest in an online ad for a particular marketing campaign to direct users to the merchant's web site, such as for an online marketing campaign that is related to a particular product/service for sale on the merchant web site and/or for a particular brand of product(s)/service(s) for sale on the merchant web site. For example, an online marketer for a merchant, such as ACME-.com, can purchase/place online ads (e.g., ad words with an online search engine, such as Google®, Yahoo®, Bing®, or another online search engine) to promote a certain product on the ACME.com web site. As used herein, an online marketer can refer to a third-party online marketer or a role within the merchant entity. For example, the online marketing campaign can be for a particular product/service for sale on the ACME.com web site and/or for a particular brand of product(s)/service(s) for sale on the ACME.com web site (e.g., Gucci® shoes or Nike® sneakers).

However, although the online marketing campaign can be used to drive traffic (e.g., to direct users) using online ads to a merchant's web site, the online marketing campaign and the online marketing manager (e.g., the person(s) responsible for the online marketing campaign) typically does not have control over content (e.g., content on one or more web pages) on the merchant web site. Specifically, a merchant web site often does not have content on the site that can be effectively used as a landing page (e.g., a landing web page) for an online marketing campaign; nor does the merchant web site have a mechanism for tracking and measuring performance of the online marketing campaign from the process of a user clicking an ad link through the user experience and activity on the merchant web site. For example, an effective web page may exist on the web site but is not currently being used as a landing page; effective content may exist but the content is not organized correctly on the web site (e.g., the content may be dispersed across the site or not on a single landing page); effective content does not currently exist on the web site and should be created and added to the web site and/or landing page or the most effective content and web page is often different for different users, hence, the there is a need for dynamic landing pages that can be targeted to different users based on user context, such as further described herein. For example, in some cases, such as when a user is directed to a web site via an ad link, a landing page is the web page at which a user is directed from an external referral, such as an online ad or paid search results links (e.g., a destination URI/URL of the online ad (ad link) such that when a user clicks on the online ad, then the user can be directed to a home page of the merchant web site, a category page of the merchant web site, and/or another landing page on the merchant web site based on the destination URI/URL).

More specifically, existing web pages of the merchant web site often do not have content that is relevant or customized to a channel (e.g., a paid marketing channel, a social channel, an organic search channel, a direct marketing channel, an email channel, etc.) or campaign (e.g., an online marketing campaign). In particular, to modify existing content on the merchant web site is typically a process that is technically and/or administratively difficult, time-consuming, and slow to implement and obtain approval to launch on the web site to make any modifications to the existing content of the merchant web site and/or to add new content (e.g., new web pages) to the merchant web site. In addition, the admin(s)/personnel responsible for such web site content changes (e.g., information technology (IT)/web site admin personnel) are also typically different than the personnel familiar with and/or responsible for the online ad campaign(s) for the web site (e.g., online marketer personnel).

What are needed are new and improved techniques to facilitate dynamic content for presentation on web sites that can be efficiently and effectively configured to provide dynamic landing pages. Accordingly, techniques for dynamic landing pages are disclosed. For example, an online marketer can use the disclosed dynamic landing pages system to configure customized/dynamic content for a particular channel and/or for online marketing campaign that can facilitate a more targeted dynamic landing page for the particular channel and/or online marketing campaign (e.g., to facilitate a more effective online marketing campaign from the online ad through the post-click/post-visit process of a customized dynamic landing page), such as further described herein.

Dynamic Landing Pages—Overview

Techniques for dynamic landing pages are disclosed. In some embodiments, a system for dynamic landing pages includes a dynamic selector engine executed on a processor for selecting a dynamic landing page in response to a request for a destination Uniform Resource Indicator (URI) of a web site (e.g., from a referrer URI (HTTP referrer)); and a proxy service for returning the dynamic landing page. For example, the dynamic landing page can correspond to a web page that is returned in response to the request for the destination URI, and the web page can include customized content that is targeted for a campaign, channel, source, and/or user. As another example, the dynamic landing page can correspond to a web page that is returned in response to the request for the destination URI (e.g., an advertising link, or specific sub-domain, such as www.merchant.com/th or www.merchant.com/br), and the web page can include customized content (e.g., including a widget) for an online advertisement campaign that is associated with the destination URI (e.g., an advertising link that is a destination URI) to facilitate a targeted online advertisement campaign from the online ad through the post-click/post-visit process of a dynamic landing page (e.g., a web page that can include customized content and dynamic content, such as dynamic/customized content generated using a widget).

In one embodiment, dynamic landing pages can be used to enhance online ads and marketing campaigns, such as further described herein. As also described herein, dynamic landing pages can also be applied to any online/web-based interaction and entry to a web site. As used herein, a landing page generally refers to an initial web page that a user arrived or "landed" on, when navigating or being directed to a web site. For example, traffic to a web site can originate from ads/online marketing campaigns, and can also originate from other sources, such as an organic search on an online search engine (e.g., Google®, Yahoo®, Microsoft Bing®, etc.), a direct input of a merchant URL to the browser, social media, and/or other sources.

As an example, for a repeat visitor/user from organic search to a given web site (e.g., if a given user has previously visited the web site, then past monitored/tracked user behavior for the user, such as historical user behaviors and preferences can be determined to provide a user context for the user, and, in this example, the user has clicked from an organic search result on search engine to arrive at the web site), techniques for providing dynamic landing pages as disclosed herein can be implemented to target a more relevant dynamic landing page for the repeat visitor/user (e.g., based on the user context determined for the user based on previously monitored user behavior associated with the repeat visitor/user). These and various other example use case scenarios for dynamic landing pages are further described herein.

In an example implementation, dynamic landing pages can be delivered by a third-party outsource/service provider as a dynamic landing page service, such as described herein.

In one embodiment, the proxy service also receives the request for the URI (e.g., destination URI) of the web site from the referrer URI. For example, the destination URI can be associated with an online advertisement campaign. In one embodiment, the proxy service also returns the dynamic landing page to a web browser executed on a user computing device.

In one embodiment, the system for dynamic landing pages further includes a widget rendering engine for rendering a widget included in the dynamic landing page. For example, the dynamic landing page can be implemented as a web page, and the widget can provide customized content for the web page that is targeted for an online advertisement campaign that is associated with the destination URI.

In one embodiment, the dynamic selector engine also dynamically selects the dynamic landing page based on the referrer URI. For example, the referrer URI can also be associated with an online advertisement campaign or channel (e.g., organic search, direct, email, etc.).

In one embodiment, the dynamic selector engine also dynamically selects the dynamic landing page and content to be shown on the dynamic landing page based on the destination URI and/or the referrer URI, as well as based on a user context (e.g., user behavior and/or other user context, such as user attributes, user geography, date/time, etc.).

In one embodiment, the dynamic selector engine also dynamically selects the dynamic landing page from a plurality of dynamic landing pages to perform A/B testing (e.g., comparison testing among two or more different dynamic landing pages). For example, two or more different dynamic landing pages can be configured with customized/dynamic content for an online advertisement (ad) campaign. The dynamic selector engine can be configured to select among the two or more different dynamic landing pages associated with a destination URI that is associated with an online ad for an online ad campaign. The performance of the different dynamic landing pages (e.g., revenue related performance or other performance related metrics) can be tracked and reported to determine which of the dynamic landing pages performs better for the online advertisement campaign (e.g., based on selected/configured performance criteria). Based on the tracked performance metrics and selected/configured performance criteria, one or more of the two or more different dynamic landing pages can be favored or promoted for use more frequently or exclusively for the online ad campaign to improve overall performance of the online ad campaign.

In one embodiment, the system for dynamic landing pages further includes injection of dynamic content blocks. For example, the dynamic content blocks of the dynamic landing page can be provided using widgets, such as further described herein. In an example implementation, a widget can be configured to re-rank products listed on a dynamic landing page (e.g., based on metrics, such as revenue, availability, and/or other metrics or criteria).

In one embodiment, the proxy service also caches select content for the dynamic landing pages and as part of the page-serving process. For example, the dynamic landing page (e.g., and/or generated dynamic content/widgets of a given dynamic landing page) for a given destination URI can be cached for a predetermined period of time to improve response time performance of the proxy service, such as further described herein.

In one embodiment, the system for dynamic landing pages further includes tracking performance associated with dynamic landing pages and reporting analytics based on the tracked performance associated with dynamic landing pages to provide performance analytics for various dynamic landing pages and online marketing/ad campaigns or channels/ sources associated with such dynamic landing pages. For example, various analytics can be monitored and reported for dynamic landing pages to provide greater insight into the performance of an associated online marketing/ad campaign (e.g., including, for example, A/B testing, geographical related metrics, brand related metrics, user visits, add to cart (ATC), revenue per visit (RPV), and/or other metrics).

In one embodiment, the system for dynamic landing pages further includes an easy-to-use user interface for configuring customized content and/or dynamic content for the dynamic landing page. For example, a What You See Is What You Get (WYSIWYG) user interface is described below that can be used by an administrator (admin) (e.g., a marketer or other user) for managing dynamic landing pages. In an example implementation, an admin has rich and detailed controls to manage the landing page experience, in which the admin can insert dynamic content into a page, configure the prioritization used to display dynamic content (e.g., based on ATC, RPV, visits, user preferences, and/or other metrics), determine in what context to display the dynamic content (e.g., for a specific channel, campaign, geography, repeat visitor, and/or other user characteristics), configure A/B tests, and/or view analytics and results related to dynamic landing pages or A/B tests, such as further described below with respect to various embodiments.

As further described below, these and various other features and techniques are disclosed for providing dynamic landing pages to enhance online web services, such as for e-commerce web sites (e.g., merchant sites).

Overview of an Example Dynamic Landing Pages Service

FIG. 1 is a block diagram illustrating a dynamic landing pages service in accordance with some embodiments. In an example implementation, dynamic landing pages can be delivered by a third-party outsource/service provider as a dynamic landing pages service 120, such as described herein.

As shown, various user/client computing devices, such as a laptop computer 102, a desktop computer 104, a smart phone 106, and a tablet 108 (e.g., and/or various other types of computing devices that can access the Internet to browse, for example, various types of web sites) are in communication with Internet 140 to access various web sites provided by different web servers 130A, 130B, . . . , 130N (e.g., which can each serve one or more web sites, such as one or more different merchant web sites).

For example, the web servers can each provide a web site, such as a merchant's web site that can offer various products and/or services for sale from the merchant and/or various other types of web sites. Each of the web sites can also include various content that can be used to customize/personalize content of each dynamic landing page that can be configured for respective online advertising campaigns, specific channels, traffic sources, or users.

In an example implementation, the merchants of each of the web servers can subscribe to dynamic landing pages service 120 (e.g., which can be provided as a cloud-based dynamic landing pages service for web sites). In some implementations, the dynamic landing pages service provides various techniques for generating and returning dynamic landing pages for targeted channels/sources or targeted users, or in response to an advertising link associated with an online advertising campaign for the merchant's web site, such as disclosed herein.

In one embodiment, the dynamic landing page corresponds to a web page that is returned to a web browser executed on a user/client computing device (e.g., via a proxy service of the dynamic landing pages service) in response to the request for the URI (e.g., an advertising (ad) link, such as a key word-based ad link or other online ad; a specific channel, such as a social channel, email channel, organic search channel; a geography; and/or users with specific preferences, behaviors, or history; etc.) that is selected (e.g., clicked) by a user when browsing on a third party web site 135 (e.g., a search engine web site or other web site that can display the ad link). The dynamic landing page can include customized content (e.g., in some cases, also including a widget and/or other dynamic content) for an online advertisement campaign that is associated with the URI (e.g., an advertising link that includes the destination URI). In particular, by providing dynamic landing pages that are customized for a given online advertising campaign, a more effective and targeted online advertisement campaign and user experience can be provided from the online ad through the post-click/post-visit process of a dynamic landing page.

In some implementations, the dynamic landing pages service can be implemented on a computer server or appliance (e.g., or using a set of computer servers and/or appliances) or as a cloud service, such as using Amazon Web Services® (AWS) or other cloud service providers. For example, dynamic landing pages service 120 can be implemented on one or more computer server or appliance devices or can be implemented as a cloud service, such as using Amazon Web Services® or another cloud service provider for cloud-based computing and storage services.

Overview of an Example Dynamic Landing Pages System

Figure 2:
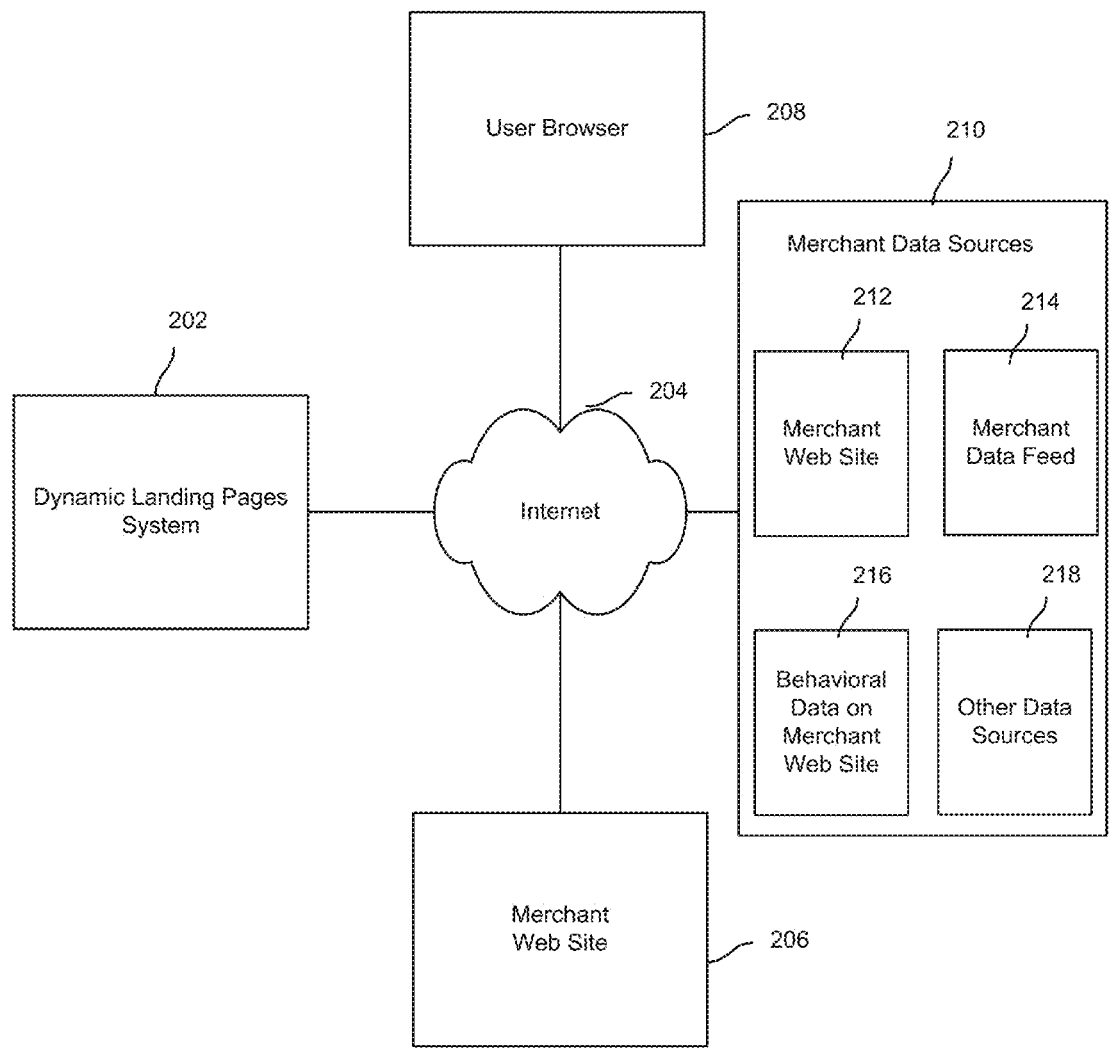
FIG. 2 is a functional block diagram illustrating an architecture of a system environment for providing dynamic landing pages in accordance with some embodiments.

FIG. 2 is a functional block diagram illustrating an architecture of a system environment for providing dynamic landing pages in accordance with some embodiments. FIG. 2 provides an exemplary architecture of a dynamic landing pages system 202 for providing dynamic landing pages to facilitate enhanced online web services that can be implemented using various computing hardware and performing various processes executed on computing hardware as will be further described below. For example, dynamic landing pages system 202 can be implemented on the dynamic landing pages service 120 as shown in FIG. 1.

Referring to FIG. 2, dynamic landing pages system 202 is shown in communication with Internet 204. Dynamic landing pages system 202 is in communication with one or more merchant web sites, such as a merchant web site 206 as shown. Dynamic landing pages system 202 is also in communication with one or more user browsers, such as a user browser 208 as shown (e.g., a web browser, such as Apple Safari®, Google Chrome®, Microsoft Internet Explorer®, or another web browser, which can be executed on a user client/computing device, such as a laptop/desktop computer, tablet, smart phone, smart watch, or another client device capable of Internet/WWW access). Also, merchant web site 206 is in communication with user browser 208 via Internet 204 as also shown. Dynamic landing pages system 202 is also in communication with various data sources (e.g., merchant web services related data sources) via Internet 204, such as further described below.

As also shown in FIG. 2, data sources include various merchant data sources, shown as merchant data sources 210. As shown, merchant data sources 210 can include a merchant web site 212 (e.g., a corpus of content, such as one or more web pages that are published on the merchant's web site 206), a merchant content data feed 214 (e.g., a merchant product data feed and/or other merchant content data feed, such as further described below with respect to various embodiments), behavioral data on the merchant web site 216 (e.g., user behavior on merchant web site 206 can be captured using pixel log data techniques, such as further described below), and various other data sources 218 (e.g., various other web data sources including search logs, social media data sources, electronic mail data sources, browsing history data sources, and/or other data sources can be provided).

As will now be apparent to one of ordinary skill in the art, similar web services related data for a plurality of different web sites (e.g., different merchant web sites and/or other types of web sites that utilize online ad campaigns for e-commerce) can be provided to facilitate using dynamic landing pages system 202 as, for example, a cloud service for enhancing web service related online ad campaigns for merchant and/or other web sites by applying dynamic landing pages techniques for web services (e.g., a subscription service for dynamic landing pages for merchant web sites, which can be implemented as a cloud service), such as further described herein.

In an example implementation, dynamic landing pages system 202 is in communication with each of the merchant data sources, such as shown in FIG. 2, to receive merchant web site data, merchant data feeds, behavior data on the merchant web sites, and/or other data sources for each of the one or more merchants. For example, merchants can subscribe to a cloud service for dynamic landing pages to improve web service related to online ad campaigns, online traffic sources/channels, and/or users for their respective web sites. As another example, a merchant can implement the dynamic landing pages system as an integrated solution with their web site (e.g., implemented locally in the merchant's own data center or with a cloud service provider that hosts their web site(s), such as using Amazon Web Services® (AWS) or other cloud service data center providers).

In some embodiments, the above-described data sources (e.g., data sources 210 such as for a given merchant and/or other data sources for other merchants) can be processed using various techniques as described below. For example, a web site content fetching process can be performed (e.g., implemented using a web site content fetching engine) to fetch web pages from a merchant web site (e.g., to periodically (crawl and) fetch web pages from merchant web site 206, and also shown as data source, merchant web site 212 of merchant data sources 210). The content (e.g., HTML content, dynamic content such as Java Script content, and/or other content) from the fetched web pages from the merchant web site can then be parsed to extract attributes for a product, such as a title, a heading, a description, a price, a color(s), and/or a size(s). As another example, a merchant data feed retrieving process can be performed (e.g., implemented using a merchant data feed retrieving engine) to retrieve merchant content/product data feeds (e.g., merchant data feed 214) and parse product attributes, such as title, heading, description, and/or price. In some cases, a merchant data feed can include a content classification (e.g., a merchant product data feed can include a product classification). As yet another example, a behavior data collection process can be performed (e.g., implemented using a behavioral data collection engine) using pixel data on a merchant's web site. Using this approach, when a user visits a web page of a given merchant's web site, then dynamic content (e.g., Java Script code or other dynamic code/content) on the web page generates a pixel request to the merchant data sources (e.g., a server that is provided for capturing behavioral data on the merchant web site, such as shown as merchant data sources 210) that includes, for example, a machine IP (e.g., the IP address associated with the user's device), a user ID (optional), a referrer URL (e.g., the URL of the web page that preceded the web page in question), a web page URL, and/or other information (optional). In this example, raw pixel data can then be provided from each of the merchants (e.g., shown as behavioral data 216 for merchant web site 206). Each of the data sources is described in more detail below in accordance with various embodiments.

As similarly described above, a continuous/periodic process can be performed to fetch pages from a merchant web site (e.g., implemented using a web site content parsing engine, which can be implemented to perform fetching and parsing operations as described herein). For example, the fetching operation can receive as input a list of URLs on a merchant web site and can then fetch the content of the web page (e.g., HTML and/or other content on each of the fetched web pages). The HTML content of a fetched web page can then be parsed using parsing rules configured for merchant web pages (e.g., manually configured for a particular merchant's web pages or using a default configuration for parsing typical merchant web pages). The parser operation can parse each page to extract attributes, such as title, heading, description, and price. As such, content published on a merchant's web site can be fetched and parsed, and the merchant's web site content can then be used for performing various dynamic landing pages techniques disclosed herein.

As similarly described above, a process can be performed to retrieve merchant data feeds for each of the merchants (e.g., implemented using a merchant data feed retrieving engine as disclosed herein). In an example implementation, the merchant can either provide a location to fetch the merchant data feed or upload the merchant data feed to a location specified for retrieving (e.g., pulling) the merchant data feed (e.g., periodically or upon demand). For example, the merchant data feed can be provided as a file (e.g., in a structured data format that can be parsed, such as in an XML or other file format that provides a (subset) view of, for example, a merchant's product/service catalog, such as by providing incremental updates to product catalog information using such merchant data feeds). In some cases, the merchant data feed can be provided on a daily or hourly basis (e.g., or at some other periodic/time interval and/or based on demand). The merchant data feed can be parsed using parsing rules configured for a given merchant or a set of merchants (e.g., based on types/groups of merchants) to extract attributes, such as title, heading, description, price, and/or various other attributes. For example, the merchant data feed includes a content classification (e.g., a merchant product data feed can include a product classification) that can then be used for performing various dynamic landing pages techniques disclosed herein.

Another data source of information is behavioral user data on a web site, such as merchant web site 206. In some cases, a user may visit a merchant web page, such as a user using user browser 208 via Internet 204. For example, Java Script code (e.g., or other executable code/content) on the web page can make a pixel request to a server/service (e.g., to a server/service of the merchant data sources and/or a server/service of the service provider for the dynamic landing pages system) that includes, for example, a machine IP (e.g., the IP address associated with the user's device), a user ID (optional), a referrer URL (e.g., HTTP referrer), a web page URL, and/or other information (optional). The list of web page URLs can be combined periodically (e.g., each day or at some other periodic interval) and provided as input to the above-described fetching and parsing process to extract information from web pages of a merchant's web site. In an example implementation, for each user, information can be stored to identify products visited and purchased by the user.

Similarly, information can be stored to aggregate all user visits and products purchased on a merchant web site. As such, various web site activity related metrics, such as number of impressions, number of views, add to cart actions, number of purchases, and/or other metrics, can be collected to provide behavioral data on a merchant's web site, and the behavioral data on the merchant's web site can then be stored and used for performing various dynamic landing pages techniques disclosed herein.

In one embodiment, the above-described processes for merchant data sources' collection and processing are performed per each merchant. For example, each merchant's data is processed independently using the above-described processes for processing each merchant's respective data sources to implement various dynamic landing pages techniques disclosed herein for each of the merchant's respective web sites.

For example, a third-party outsource/service provider (e.g., a web solutions service provider) can implement a dynamic landing pages service for merchants that can be used by merchants to enhance online marketing campaigns using online ads for the merchants' respective e-commerce web sites, such as described herein. Dynamic landing pages enable web site administrators (admins) (e.g., in some cases, this can include digital marketers) for web site providers (e.g., a merchant with an e-commerce web site for selling products/services, and/or other types of web sites) to create web pages with configurable/customized content to target web site visitors based on different criteria, such as current intent (e.g., query/keyword for paid search, etc.), channel (e.g., paid search, display, social, etc.), online ad campaign, behavioral data (e.g., products/categories viewed, add-to-cart, etc.), user data (e.g., repeat versus new visitor, geography of user, user device, user interest/affinity, etc.), content on web page and web site, and/or out-of-stock/in-stock information.

In an example implementation, the web site administrator can insert and configure dynamic content blocks on web pages or configure the entire web page as a dynamic content block. Examples of dynamic content blocks include web page, re-rank of products, products, categories and/or themes, and/or banner, image, or text, such as further described herein.

In one embodiment, the web site administrator uses a WYSIWYG editor to drag and drop widgets into the dynamic content block and sets target criteria as to when a particular widget should be displayed in a dynamic content block. For example, if the visitor arrives at the landing page based on ad campaign A for the ACME.com web site, then a widget A can be displayed in the dynamic content block, but if a visitor arrives at the landing page based on ad campaign B for the ACME.com web site, then a widget B can be displayed in the dynamic content block.

For example, products displayed in a dynamic content block can be re-ranked based on various criteria, such as revenue generated, conversion rate, user preferences and user behavioral data, total views, or depending on the channel from which the visitor arrives at the landing page. Using the disclosed dynamic landing page techniques, a web site admin (e.g., in some cases, an online marketer or other user) is able to target and provide personalized content on web pages to different types of visitors in response to online ads associated with different online marketing campaigns or to different online traffic sources/channels or users (e.g., which is a different approach to providing relevant content to users of the web site than, for example, using Bloom-Reach's Landing Page Manager solution to infer intent from keywords and select from a repository of curated thematic pages as provided by BloomReach's Landing Page Manager solution). Moreover, the web site admin can change the non-configurable portion of the web page (e.g., other than the dynamic content blocks, in which this can be performed, for example, outside of the dynamic landing pages product/service, such that even though a content or web page change may occur outside of dynamic content blocks provided on dynamic landing pages, the web site experience remains consistent, such that a merchant web page "look and feel" remains consistent, and any other maintenance of the web site is not affected) and does not have to update the dynamic content blocks or related targeting criteria.

In an example implementation, a dynamic landing pages solution (e.g., implemented as a product and/or service) is disclosed that can be used to provide the following product/service related goals. For example, dynamic landing pages can allow web site providers to easily manage and deliver dynamic landing pages. In some cases, page content and targeting criteria for delivery can be based on one or more of the following: current intent (e.g., query/keyword for paid search, etc.), channel (e.g., paid search, display, social, organic search, direct, etc.), online ad/marketing campaign, behavioral data (e.g., products/categories viewed, add-to-cart, etc.), user data (e.g., repeat versus new visitor, geo, device, interest/affinity, etc.), content on the page and site (e.g., products, categories, text, etc.), content performance metrics (e.g., relevance, revenue per visit, conversion rate, views, etc.), out-of-stock/in-stock information, product/service price, manage and test landing page versions (e.g., A/B testing of different dynamic landing pages), and tracking of key metrics to provide performance analytics for dynamic landing pages.

In an example implementation, a dynamic landing pages solution (e.g., implemented as a product and/or service) is disclosed that can be used to provide one or more of the following product/service aspects. A dynamic landing pages solution can be applied to any type of landing page. A dynamic landing pages solution can be implemented as a high availability, high throughput, and low latency web page serving service. A dynamic landing pages solution can generate and report various performance data tracking and analytics processed and available periodically (e.g., hourly, daily, weekly, etc.). A dynamic landing pages solution can allow a customer (e.g., web site provider) to enable dynamic landing pages with minimal integration cost and effort while maintaining the overall "look and feel" of the dynamic landing page to be similar/consistent with other, existing web pages of the merchant web site. A dynamic landing pages solution can be implemented as a modular design that allows web page editing capabilities to be used across a platform for enhanced web services (e.g., using a service provider's platform, such as the BloomReach Personalized Discovery Platform with, for example, applications for organic search, site search and content marketing and merchandising, and integration to access all the power of the Web Relevance Engine). A dynamic landing pages solution can provide a WYSIWYG interface that provides easy access and management of dynamic landing pages and content blocks (e.g., dynamic content blocks and/or other customized content blocks).

Figure 3:
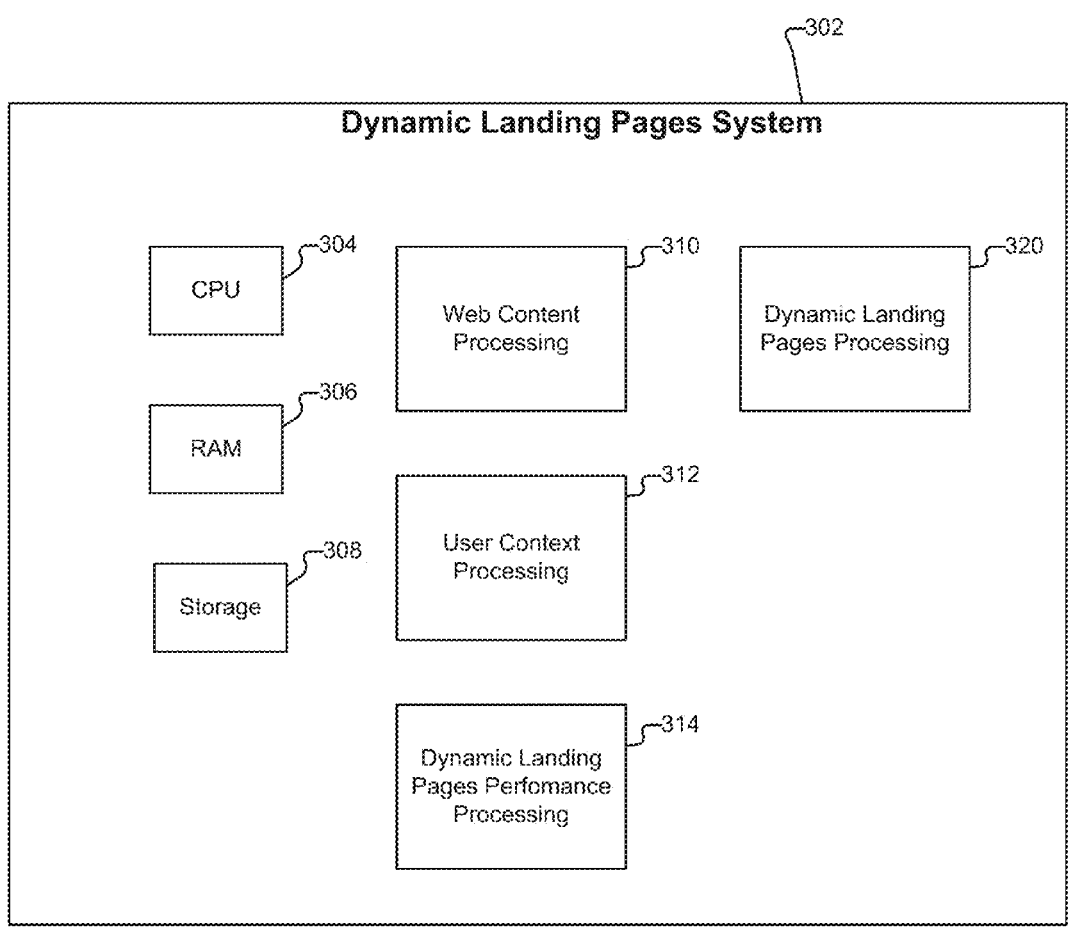
FIG. 3 is a functional block diagram illustrating a dynamic landing pages system in accordance with some embodiments.

FIG. 3 is a functional block diagram illustrating a dynamic landing pages system in accordance with some embodiments. As shown, a dynamic landing pages system 302 includes a CPU 304, a RAM 306, and a data storage 308. For example, dynamic landing pages system 302 can be implemented to provide the dynamic landing pages service 120 as shown in FIG. 1 and the dynamic landing pages system 202.

As also shown in FIG. 3, dynamic landing pages system 302 includes a web content processing component 310 (e.g., to process web content of a web site to implement various dynamic landing pages techniques described herein), a user context processing component 312 (e.g., behavior signal data that provides monitored/tracked user activities data can be provided for subscriber/monitored web sites by using click logs/pixel tags data for monitoring user activities during a session to provide a user's browsing history, and/or other behavior signal data as described herein), dynamic landing pages performance processing component 314 (e.g., for processing performance signals associated with one or more dynamic landing pages for subscriber/monitored web sites, which can be used to generate performance reports for dynamic landing pages associated with a given online marketing/ad campaign and/or to perform a feedback loop based on A/B testing of a plurality of dynamic landing pages for a given online marketing/ad campaign, as further described herein), and a dynamic landing pages processing component 320 (e.g., for selecting and generating dynamic landing pages based on an ad link (e.g., destination URI), a referrer URI, input received from web content processing, user context processing (e.g., behavior signal processing), and/or dynamic landing pages performance processing components, as further described herein). The processing performed by each of these components is further described below. In some implementations, one or more of these functions can be performed by another device or function, such that the user context/behavior signal processing and/or the other signal processing can be performed using another device or function, which can provide respective input to the dynamic landing pages system. As another example implementation, various components can be implemented as a common component, such as a user context/behavior processing component that can be implemented to receive and process both behavior signals and other signals (e.g., dynamic landing pages performance signals). In an example implementation, the dynamic landing pages system is implemented using the Apache Solr open source framework as further described below with respect to FIG. 4.

In an example implementation, dynamic landing pages system 302 can be implemented to provide the dynamic landing pages service 120 described above with respect to FIG. 1 and the dynamic landing pages system 202. For example, a dynamic landing page for an ad link associated with an online marketing/ad campaign for a subscribing merchant web site (e.g., a web site that subscribes to dynamic landing pages service 120) can be processed using CPU 304 and RAM 306 to automatically generate a dynamic landing pages that can be stored (e.g., cached) in storage 308 and communicated to a user that clicked the ad link for presenting the automatically generated dynamic landing pages to the user via the user's web browser executed on the user's device (e.g., a client/computing device, such as via a web browser executed on a smart phone, laptop, computer, or other client/computing device).

An example component diagram showing various components of dynamic landing pages system 202 of FIG. 2 and dynamic landing pages system 302 of FIG. 3 will now be described with respect to FIG. 4. Various dynamic landing pages techniques are also further described below with respect to FIG. 4.

Components of the Dynamic Landing Panes System

Figure 4:
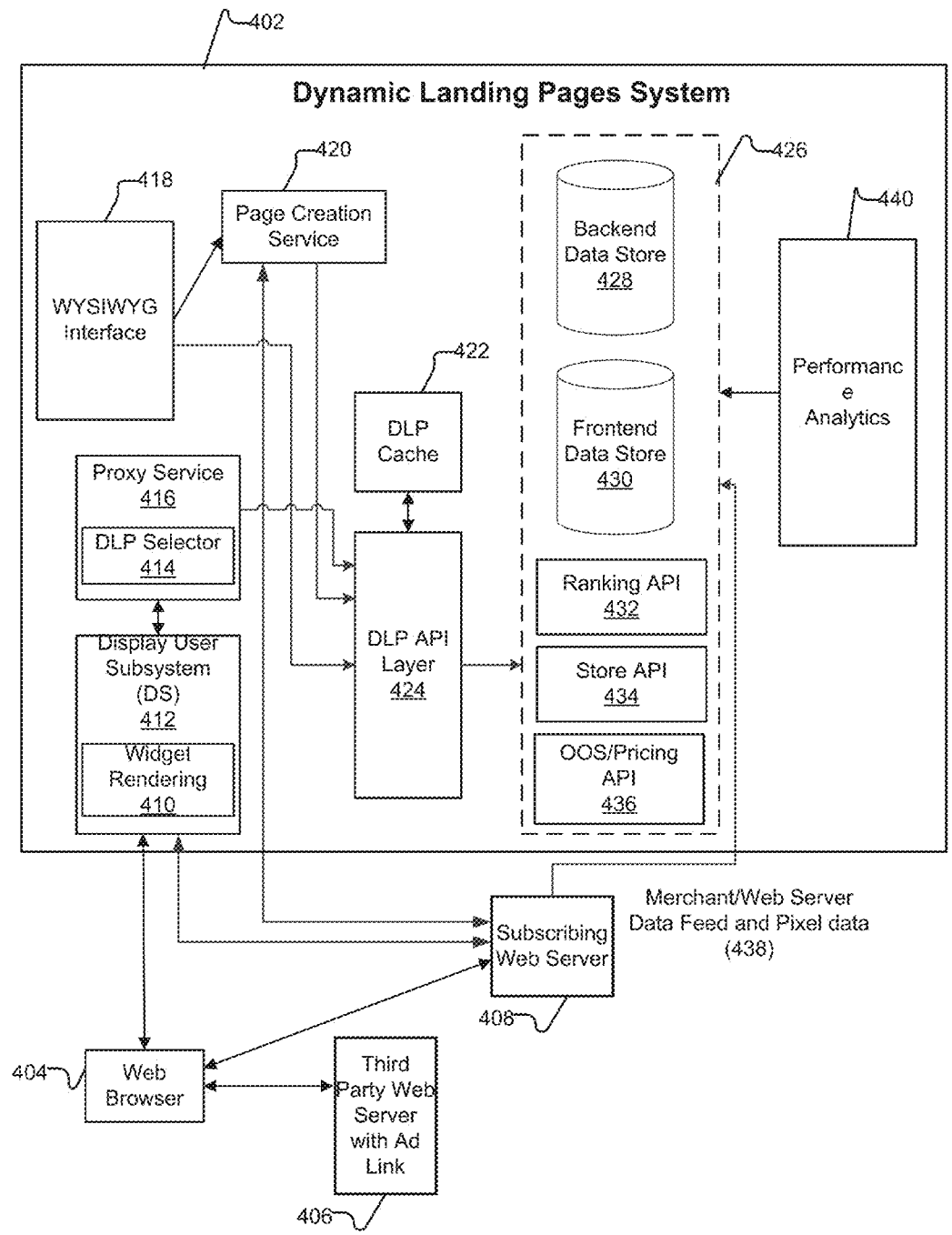
FIG. 4 is a functional block diagram illustrating components of the dynamic landing pages system in accordance with some embodiments.

FIG. 4 is a functional block diagram illustrating components of the dynamic landing pages system in accordance with some embodiments. In particular, FIG. 4 illustrates an architecture of a system for providing dynamic landing pages for a web site (e.g., a merchant web site or other web site) in accordance with some embodiments.

As shown in FIG. 4, a WYSIWYG interface 418 (e.g., a modular WYSIWYG admin user interface (UI) that provides a graphical user interface (GUI) for configuring and customizing web pages) is in communication with a page creation service 420. WYSIWYG interface 418 and page creation service 420 can be used by an admin (e.g., a marketer or other user) to create dynamic landing pages as further described herein. For example, WYSIWYG interface 418 can be implemented as an Admin UI (e.g., or other front-end user interfaces can be provided) to customize a web page (e.g., a modified home page of a subscribing web site, a modified category or product page of a subscribing web site, and/or a new web page of a subscribing web site) to generate a customized dynamic landing page. The page creation service 420 can be implemented to generate a completely new web page that can be provided as the customized dynamic landing page.

WYSIWYG interface 418 is also in communication with a dynamic landing pages (DLP) API layer 424 (e.g., a DLP API Library). A DLP caching component, shown as a DLP cache 422, is provided for the DLP API layer 424 for caching various content for generated dynamic landing pages (e.g., widgets and/or other content of the generated dynamic landing pages) that can be used for implementing dynamic landing pages, such as further described below.

DLP API layer 424 is in communication with a data storage layer 426 that includes a backend data store 428. As shown, a subscribing web server 408 is in communication with data storage layer 426 via a merchant/web server data feed and pixel data 438 (e.g., to provide merchant/web server data and pixel/user behavior data associated with a subscribing web site, such as described herein). For example, backend data store 428 can be implemented using a SOLR data cluster that is optimized for throughput, which can store merchant web site data, merchant data feed(s), user context/behavioral data on a merchant web site, and/or other data sources, including performance analytics data received from performance analytics component 440. As shown, data storage layer 426 also includes a frontend data store 430. For example, frontend data store 430 can be implemented using a SOLR data cluster optimized for latency, which can store merchant web site data, merchant data feed(s), user context/behavioral data on a merchant web site, and/or other data sources, including performance analytics data received from performance analytics component 440. As also shown, data storage layer 426 includes a ranking Application Programming Interface (API) 432 (e.g., for performing various product/service rankings based on various criteria, which can be used to implement various dynamic landing pages techniques as described herein), a store API 434 (e.g., for requesting various merchant data such as product data for each subscribing merchant web site processed from each merchant's product catalog and/or scraped from each merchant's web site in order to provide a product name, product ID, image, text description, and/or other information for the merchant/product store, which can be used to implement various dynamic landing pages techniques as described herein), and an Out-Of-Stock (OOS)/Pricing API 436 (e.g., to provide OOS status and/or pricing information for each product in a subscribing merchant product catalog/merchant web site, which can be used to implement various dynamic landing pages techniques as described herein). As also shown, DLP API layer 424 is in communication with a DLP cache 422. For example, the DLP cache can cache generated dynamic landing pages (e.g., widgets and/or other content of the generated dynamic landing pages, and/or entire dynamic landing pages) to improve performance of the dynamic landing pages system, such as further described below.

DLP API layer 424 is also in communication with a performance analytics component 440 (e.g., an insights and analytics pipeline, which is further described below, and is in communication with DLP API layer 424 via data storage layer 426 as shown,). For example, the performance analytics component can provide various dynamic landing pages related performance data as input for storing in the data storage layer, such as further described below. As another example, the performance analytics component can perform data analytics on dynamic landing pages, such as to determine and report on which dynamic landing pages result in better performance (e.g., RPV, ATC, revenue, top-performing web pages, under-performing web pages, etc.) based on A/B testing of different dynamic landing pages associated with a given online marketing/ad campaign and associated tracking of performance as a feedback loop for the online marketing/ad campaign and different landing pages. As another example, the performance analytics can perform data analytics to determine which specific content (e.g. specific products, text, or images) positively influenced the overall performance of a dynamic landing page.

Dynamic landing pages system 402 also includes a proxy service 416 as shown. In one embodiment, proxy service 416 determines which dynamic landing page to generate and return in response to a received destination URI/URL (e.g., ad link), such as further described below. Proxy service 416 includes a DLP selector component 414 as also shown. For example, the DLP selector can implement a dynamic selector engine for selecting a dynamic landing page based on a destination URI and/or based on other input, such as user context and/or other input such as described herein. In some cases, the dynamic selector engine can implement A/B testing among two or more dynamic landing pages, such as further described below. Proxy service 416 is in communication with DLP API layer 424. Proxy service 416 is also in communication with a display user subsystem (DS) 412. As also shown, DS 412 includes a widget rendering engine 410 (e.g., which can be implemented as a library that can render widgets embedded in a dynamic landing page). DS 412 is in communication with a web browser 404 (e.g., a web browser executed on a user's client/computing device), which can render dynamic landing pages returned by DS 412.

As an example use case scenario, a user can click on an online ad (e.g., an ad link) that appears on a third party web server with ad link 406 (e.g., a search engine with a paid search result ad link or a web site with an ad on a web page). The ad link can be for an online marketing/ad campaign for a merchant, such as ACME.com. The ad link can be in the form of a URI/URL, such as www.ACME.com/DLP_SERVICE_PROVIDER/EXAMPLE_AD-LINK-1. When the user clicks on this example ad link, then the user's web browser will be directed to, in this example, subscribing web server 408, which corresponds to a web server for ACME.com. The ad link in this example will be resolved (e.g., by the local domain name system (DNS) server of the subscribing merchant web server domain) to a proxy server of the DLP service provider, which in this case is the dynamic landing pages system (e.g., the local DNS server can be configured to resolve www.ACME.com/DLP-SERVICE-PROVIDER to an IP address of a server/appliance that is on the dynamic landing pages service network of the DLP-SERVICE-PROVIDER in this example), shown as dynamic landing pages system 402 (e.g., a server provided by the dynamic landing pages system/service of the DLP-SERVICE-PROVIDER in this example). The proxy service receives the redirected URL request for www.ACME.com/DLP-SERVICE-PROVIDER/EXAMPLE_AD-LINK-1 and performs the proxy service functions as described herein. As further described below, based on the ad link, user context, and configurations made by the admin, dynamic landing pages system 402 will automatically generate a dynamic landing page and return the generated dynamic landing page (e.g., which may have been previously generated and cached as further described below) to web browser 404.

In one embodiment, proxy service 416 is configured to receive and process a redirected destination URI/URL (e.g., an ad link) and to generate and return a proxy/customized web page that is a dynamic landing page generated by the dynamic landing pages system/service, such as described herein. In an example implementation, the proxy service can be implemented using Java, Java Script, and/or another programming language. In an example implementation, the proxy service, which is implemented in Java using JSoup Java HTML parser (e.g., an open source library available at jsoup.org) and/or Java Script to parse a given web page (e.g., using DOM traversal and/or CSS selectors, to extract the product, product price, widget(s), etc.), determines widget(s) (if any) to inject into the web page and where on the web page (e.g., HTML page) to inject the widget, to rewrite the page, such as to extract products and send to a server for returning a re-ranked order of those products, such as based on a configured criteria, such as RPV, CVR, visits, and/or other criteria, including parsing web page structure/HTML including injection of widgets, such as dynamic content blocks, calling an API(s) for implementing widgets, and a caching layer (e.g., DLP cache) for returning previously processed URI/URL requests based on a parameter, such as a time-out parameter or other parameters. For example, the proxy service can send a request to the DLP API layer that includes various dynamic content requests for customized content/widgets, which can then determine what is displayed on the dynamic landing page, and can interact with the data storage layer to provide such customized/dynamic content (e.g., based on product and/or brands, such as products and/or trends that are trending based on criteria such as RPV, CVR, visits, user preferences, and/or other criteria).

In one embodiment, DLP selector 414 is implemented as a dynamic selector engine that determines which dynamic landing page to select in response to a request redirected to a proxy service based on a destination URI/URL (e.g., ad link), user context (e.g., geography, repeat visitor, channel, etc.), and configurations made by the admin. For example, the DLP selector can be configured to perform A/B testing among a plurality of dynamic landing pages based on various criteria (e.g., to select which dynamic landing page to return in response to a given request, which can, for example, provide different dynamic landing pages that show a different presentation of brand:product for a given online marketing campaign for that brand and product, such as described herein). In some cases, the DLP selector can be configured to customize which dynamic landing page to return in response to a given request based on a user context (e.g., behavioral data, user geography, a date/time, etc.), to perform A/B testing, and/or other variations for dynamic landing pages returned for different use case scenarios (e.g., OOS/pricing information, etc.) that facilitate targeting of the dynamic landing pages.

In one embodiment, a caching optimization is provided for the dynamic landing pages system using DLP cache 422. For example, the proxy service can utilize a caching optimization to return previously processed destination URI/URL requests, such as for www.ACME.com/DLP-SER-VICE-PROVIDER.ACME/EXAMPLE_AD-LINK-1, based on a configured criteria (e.g., based on input/condition parameters, such as user geography, a new versus repeat visitor/user so that the same user does not get the same page, and/or time-out/time-to-live (TTL) parameter, such as to time-out after five minutes, one hour, 24 hours, or some other period of time, and/or other criteria/settings).

Below is a list of additional example APIs that can be provided in the data storage layer for dynamic landing pages in accordance with some embodiments.

Targeting API—the user and content context is provided as input; and output is the set of dynamic actions/changes to be taken on the page based on the configured targeting and A/B testing conditions.
Input: referrer URL, user agent, geo, time of day, channel, campaign, page URL, etc.
Output: widget_set: {widget_A_id=123, widget_A_type='products'; widget_B_id=567, widget_B_type='rerank'; etc.}

Products API (e.g., shown as store API 434)—returns the set and sequence of products that should be shown in a products widget; includes content details such as product image, price, and description; and based on widget configuration of whether to show products based on RPV, visits, relevance, brand, keyword, trending, personalization, and/or other criteria.
Input: widget_id=123, widget_type='products'
Output: {product_position1=GRU396, product_position1_details=[name,price,image_url]; product_position2=GRU394, product_position2_details= [name='Levi's Slim Fit Jeans',price=299.99, image_url=merchant.com/image/GRU396]; etc.}

Re-Ranking API (e.g., shown as ranking API 432)—returns the sequence of products for a page that contains a set of existing products on a page; and based on configuration to show products based on RPV, visits, conversion rate, and/or other criteria.
Input: widget_id=483, widget_type='rerank', set: {product_A_ID=GRU394, product_B_ID=FDW392, product_C_ID=GRU396, etc.}
Output: ordered list with sequence: {product_position1=GRU396, product_position1_details= [name,price,image_url]; product_position2=GRU394, product_position2_details=[name,price,image_url]; etc.}

Text/HTML API—returns text or HTML that should be shown in a content widget; and includes rich style and formatting details, such as font, size, bold/italics/underline, alignment, and/or other criteria.
Input: widget_id=123, widget_type='text'
Output: text='foo text',styling={font_size=12, style='bold', alignment='center'}

In one embodiment, data storage layer 426 is a high-availability storage layer, horizontally scalable, supports primary key look-up of product/service merchant product information, supports search by various attributes of a document (e.g., a web page), and provides a reliable and fast data storage layer infrastructure. In one embodiment, the data storage layer includes a highly available, fault tolerant, and horizontally scalable key-value storage solution. Example storage solutions that can be used for implementing such a data storage layer include the following commercially available, open source storage solutions: Apache Cassandra, Apache HBase, BerkeleyDB, and LevelDB. As will now be apparent to one of ordinary skill in the art, various other commercially available and/or open source storage solutions can similarly be used to implement the data storage layer.

As similarly discussed above, the input for processing by the back-end includes the merchant data feed. In one embodiment, the topology for the data storage layer includes a back-end cluster and a front-end cluster as shown, which each include a search index (e.g., implemented using Apache SolrCloud or another indexing framework/platform, facilitating look-up by attribute/reverse index lookup, such as similarly described above) and a data store (e.g., implemented using Cassandra or another data store, facilitating primary key look-up, such as similarly described above).

In one embodiment, data storage layer 426 is implemented using cloud/remote computing services, such as provided by various cloud computing service providers (e.g., Amazon, HP, IBM, and other companies offer such commercially available cloud computing services). For example, the data storage layer can be implemented using Amazon Web Services (AWS) for data storage and computing purposes performed by the data storage layer as described herein. Various AWS instance types that can be used to implement the data storage layer are further described below.

For example, Amazon Elastic Compute Cloud® (EC2) is a commercially available cloud computing service from Amazon that can be used to implement the data storage layer for compute purposes. Amazon EC2 is hosted in multiple locations worldwide. These locations are generally composed of regions and availability zones. Each region is typically a separate geographic area. Each region typically has multiple, isolated locations known as availability zones.

In an example implementation, the data storage layer described herein includes a dedicated Cassandra cluster(s). For example, dedicated Cassandra clusters can be implemented using the following example hardware environment: 60×i2.xlarge (e.g., across three availability zones in US-East-1 region), 12×i2.xlarge (e.g., across three availability zones in US-West-1 region), and 6×i2.xlarge (e.g., across three availability zones in EU-West-1 region).

In an example implementation, the data storage layer described herein also includes a dedicated SolrCloud cluster(s). For example, dedicated SolrCloud clusters can be implemented using the following example hardware environment: 12×r3.2xlarge (e.g., across three availability zones in US-East-1 region), 6×r3.2xlarge (e.g., across three availability zones in US-West-1 region), and 6×r3.2xlarge (e.g., across three availability zones in EU-West-1 region).

As will now be apparent to one of ordinary skill in the art, various other hardware environments and/or cloud service providers can be used to efficiently and effectively implement the data storage layer to perform the various techniques disclosed herein. As another example, a data storage layer provider can implement the data storage layer using hardware in its own data center(s) and/or using a combination of hardware in its own data center(s) and one or more cloud service providers.

Proxy Service

In one embodiment, when a visitor (e.g., user that clicks an ad link) is directed to a dynamic landing page, a proxy service (e.g., proxy service 416 as shown in FIG. 4) fetches a current version of the web page (e.g., the web page associated with a destination URI/ad link) from the customer (e.g., web site provider, such as a merchant with an e-commerce site, such as subscribing web server 408 as shown in FIG. 4), creates a proxy of that web page to be provided as a dynamic landing page that includes customized content, such as a widget in the dynamic content block(s) based on the targeting criteria applicable to the visitor (e.g., user requesting the web page, such as based on user context/behavioral data associated with the user), and returns/serves the automatically generated dynamic landing page. As similarly described above, using the dynamic landing pages system (e.g., the WYSIWYG interface and page creation service), the customer (e.g., web site provider, such as a merchant with an e-commerce site, such as the merchant for subscribing web server 408 as shown in FIG. 4) can change the non-configurable portions of the web page, and these changes will be incorporated into the automatically generated and returned/served dynamic landing page, because the proxy service fetches the current version of the web page from the customer (e.g., subscribing web server 408 as shown in FIG. 4) each time a visitor (e.g., user requesting the web page) requests the landing page. In some cases, the current version of the web page does not need to be re-fetched by the proxy service from the customer (e.g., from the customer site, such as subscribing web server 408 as shown in FIG. 4) each time a visitor arrives at the landing page. For example, some or all page components that are used when serving the page can be cached (e.g., using the caching component, such as DLP cache 422 as shown in FIG. 4), which optimizes performance and minimizes latency of the dynamic landing pages service as described herein.

For example, the disclosed proxy service can reduce integration cost and risk for customers. In order to manipulate content on a web page, typical web page editing and landing page optimization solutions often require that the customer place a script (e.g., JavaScript) in the header of web site pages. This can be potentially risky to customers'/subscribers' web sites and can introduce undesired latencies or failures. The disclosed proxy service does not require a script in the header; instead the proxy can dynamically insert a script (e.g., JavaScript) into the rendered page when necessary and on the server-side. Using the disclosed dynamic landing pages techniques, customers/subscribers can simply place a standard pixel in the footer of their web site pages. The proxy's use of a sub-domain, such as described above, still ensures that any new pages or content is perceived as high quality by search engines, for purposes of paid advertising and search engine optimization (SEO).

In addition, the disclosed proxy service allows easy routing and testing of entirely different page URLs and templates. Typical landing page optimization and testing solutions allow configuration of different but static content on a given page URL and template, for a set of targeting criteria. For example, a customer can test [Page_URL_A, headline_1] versus [Page_URL_A, headline_2] using the disclosed A/B testing techniques implemented by the dynamic landing pages system/service. With the disclosed techniques, for a set of targeting criteria, the customer can configure and test entirely different page URLs and templates. For example, a customer can test [Page_URL_A, headline_1] vs. [Page_URL_B, headline_2].

Also, the disclosed proxy service provides for easy management and insertion of dynamic content widgets. For example, the disclosed WYSIWYG interface allows a customer to place and configure dynamic content on a dynamic landing page, such as further described below. With other approaches, this level of control and configuration does not exist or requires extensive Information Technology (IT)/web site admin implementation effort to make any change. For example, the disclosed dynamic landing pages techniques allow for configuration of the following: location on page of a dynamic content block; style (e.g., look and feel) of a dynamic content block; guide rails for type of dynamic content to be shown (e.g., certain categories, products, etc.); and/or sorting and organization of dynamic content to be shown (e.g., by RPV, visits, relevance, etc.), such as further described below.

WYSIWGY Interface

In one embodiment, dynamic landing pages can be created through the disclosed WYSIWYG interface that provides an intuitive user interface by, for example, facilitating the dragging, dropping, and reordering of products and modifying the web page, title, and header. Also, using the disclosed WYSIWYG interface, a user (e.g., web site admin or marketer) can add dynamic content blocks to dynamic landing pages, set the target criteria (e.g., rules for displaying different widgets in the dynamic content block), and test the configured dynamic landing page to see all configurations of the dynamic landing page (e.g., in which, in some cases, only one of which is rendered when the dynamic landing page is in production based on the target criteria applicable to a particular visitor, or which can be selected among multiple versions of the dynamic landing page based on A/B testing criteria, etc.).

For example, the disclosed WYSIWYG interface allows for rich editing of a dynamic landing page and insertion of dynamic content, including add, edit, and style H1; add, edit, and style text content using text boxes and rich text editor; add HTML from the editor; add and configure widgets (e.g., a more like this widget based on a category or a product, a trending products widget based on which products are trending on the merchant's web site, and/or a just for you widget based on a user's behavior, and/or other widgets); and/or set up targeting to show different configurations of landing page content based on rules (e.g., criteria/settings, such as based on a user context, A/B testing, etc.).

In one embodiment, the WYSIWGY interface is implemented using Angular, also known as AngularJS, which is an open source web application framework that can be used for processing of individual web pages. For example, the Angular library can be used to parse an HTML web page, which can have embedded additional custom tag attributes that can be processed by Angular to bind input or output parts of the page to a model that is represented by standard JavaScript variables.

Analytics for Dynamic Landing Pages

In one embodiment, the performance analytics component of the dynamic landing pages system tracks dynamic content blocks and what happened at each visit by a user that navigated to the dynamic landing page by clicking on an ad link (e.g., that included a destination URL associated with an online marketing campaign), which widget was displayed, conversion data, etc.

In one embodiment, data regarding individual visits and aggregate data is provided through a dynamic landing pages performance dashboard. As similarly described above, the dynamic landing pages system also provides analysis to test and compare different versions of dynamic content for a given targeting criteria. The dynamic landing pages system also identifies opportunities to use dynamic content blocks based on any of the targeting criteria, such as campaign or channel (e.g., social, paid-search, etc.) and/or other insights such as queries that led to a product, products viewed along with this product, and/or performance segmented by device. For example, once a user (e.g., web site administrator or marketer) identifies an opportunity using the analytics for dynamic landing pages, and selects the dynamic content blocks and targeting criteria for the landing page, the user can use the WYSIWGY user interface to create the dynamic landing page.

Activity Diagram for the Dynamic Landing Pages System

Figure 5:
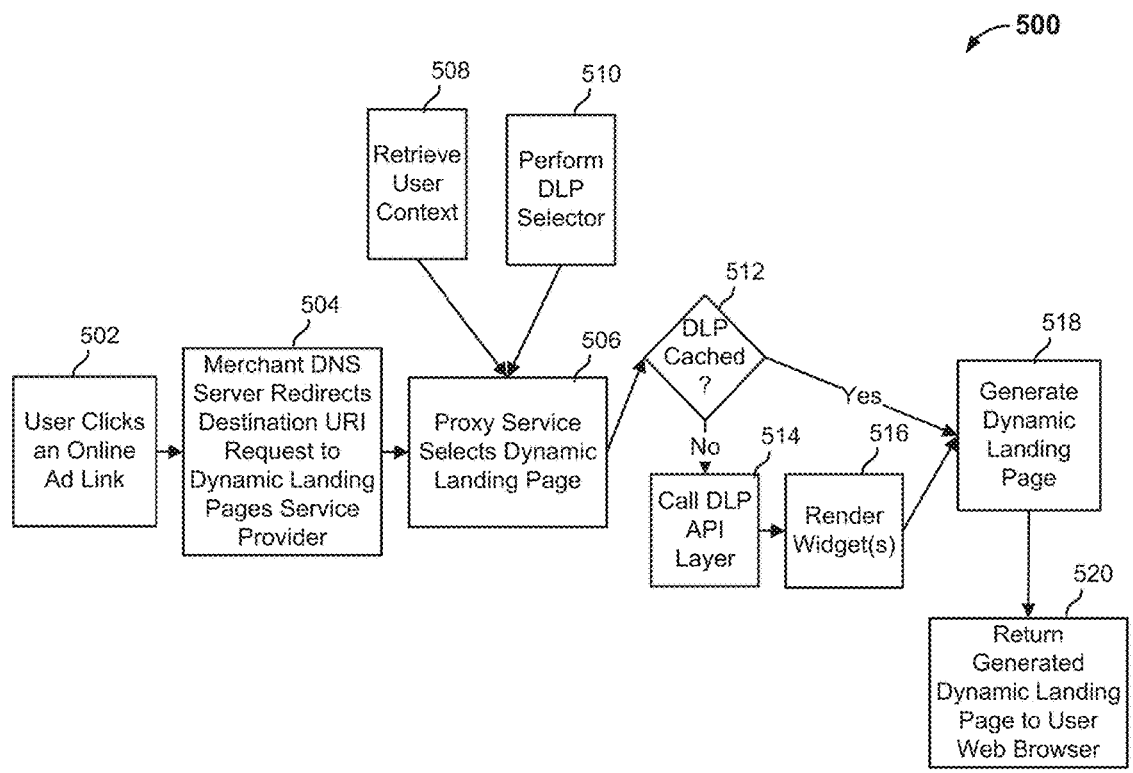
FIG. 5 is a functional block diagram illustrating an activity diagram of the system for providing dynamic landing pages in accordance with some embodiments.

FIG. 5 is a functional block diagram illustrating an activity diagram of the system for providing dynamic landing pages in accordance with some embodiments. As shown in FIG. 5, an example use case for providing dynamic landing pages is performed for an online marketing/ad campaign for a merchant web site (e.g., an e-commerce web site) to provide a customized and dynamic landing page that is targeted for the online marketing/ad campaign for the merchant web site, which can be implemented using the system and techniques described above. In one embodiment, the activity diagram 500 of FIG. 5 is performed by a dynamic landing pages system/service, such as described above with respect to FIGS. 1-4.

Referring to FIG. 5, at 502, a user clicks on an online ad link input via a user's web browser executed on a user client/computing device (e.g., a user can select an ad that is presented on a third party web site, such as a paid online search ad presented as a response to a user's query on a search engine web site or an online ad presented on the third party web site, such as an online ad in an online news web site or online social networking web site, merchant web site, or other web site; or a user can select an ad link that is received in a promotion electronic mail (email) with the ad link or other online communication, etc.).

At 504, the selected online ad link, which includes a destination URI (e.g., DLP-www.ACME.com/DLP-SERVICE-PROVIDER/EXAMPLE_AD-LINK-1), is received at a DNS server on the merchant's web site domain, and the merchant's DNS server is configured to redirect the requested destination URI to an IP address of a web server that is on the dynamic landing pages (DLP) service provider's domain (e.g., the domain associated with DLP-SERVICE-PROVIDER in the case of the above example ad link of www.ACME.com/DLP-SERVICE-PROVIDER/EXAMPLE_AD-LINK-1). For example, as part of implementing the DLP service for the merchant's web site, the DLP service provider can instruct the merchant to configure their local DNS server(s) to process URI, such as www.ACME.com/DLP-SERVICE-PROVIDER, to be redirected to a predetermined IP address associated with the DLP service provider's domain such that the DLP system/service provided by the DLP service provider can process such ad links to return appropriate dynamic landing pages as described herein.

At 506, a proxy service of the dynamic landing page service selects a dynamic landing page based on the destination URI associated with the online ad link by performing a DLP selector at 510 (e.g., using the dynamic selector engine, such as described above). At 508, a user context is received and provided as input to the proxy service (e.g., user context input can be provided by the data storage layer, such as described above, and can be used as input, in some cases, which can be used by the DLP selector engine for selecting/processing the dynamic landing page, such as described herein). As also described above, if multiple dynamic landing pages are configured as potential dynamic landing pages to be selected in response to the destination URI, then the DLP selector engine can determine which dynamic landing page to select at 510 (e.g., to perform A/B testing and/or based on various criteria/contexts, such as described herein).

At 512, a DLP cache is checked to determine if the selected dynamic landing page has been previously cached. If so, activity proceeds to 518. If not, then activity proceeds to 514.

At 514, the DLP API layer is called to call any APIs included within the selected dynamic landing page. Example APIs can include a ranking API, a store API, and/or an OOS/Pricing API, and/or the other APIs such as described above, and/or various other APIs as would now be apparent to one of ordinary skill in the art in view of the various embodiments disclosed herein. At 516, any widget(s) included within the selected dynamic landing page are rendered (e.g., using a widget rendering engine, such as described above).

At 518, the dynamic landing page is generated (e.g., using the display user subsystem (DS), such as described above). At 520, the generated dynamic landing page is returned to the user web browser executed on the user's client/computing device for display to the user.

In one embodiment, a plurality of different dynamic landing pages can be configured (e.g., using the WYSIWYG interface, such as described above), which can be used for different online marketing/ad campaigns and/or for performing various A/B testing, such as further described below with respect to FIGS. 6A-B.

Figure 6A:
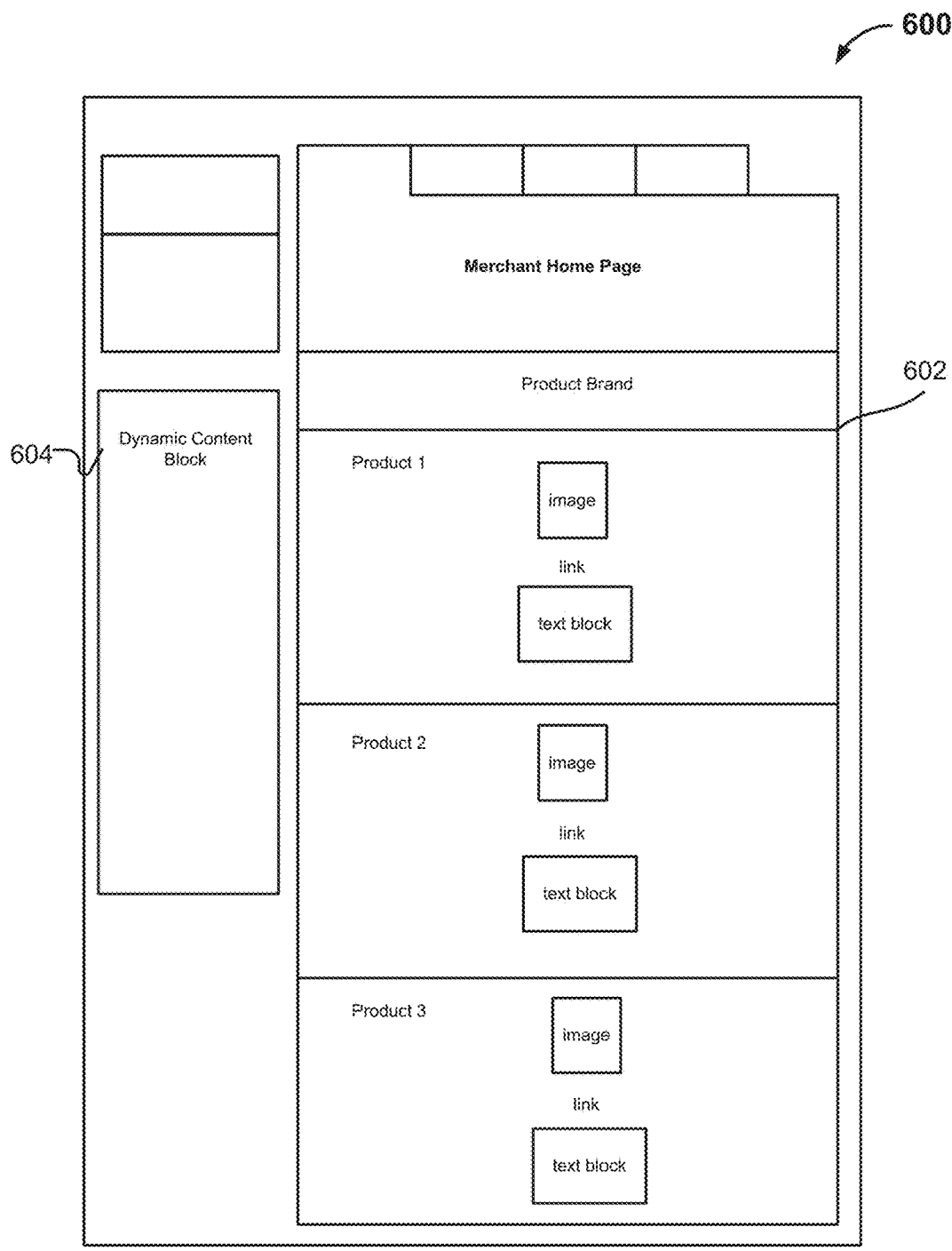
FIGS. 6A-B illustrate example dynamic landing pages that include widgets that are populated with content identified using the disclosed techniques in accordance with some embodiments.
Figure 6B:
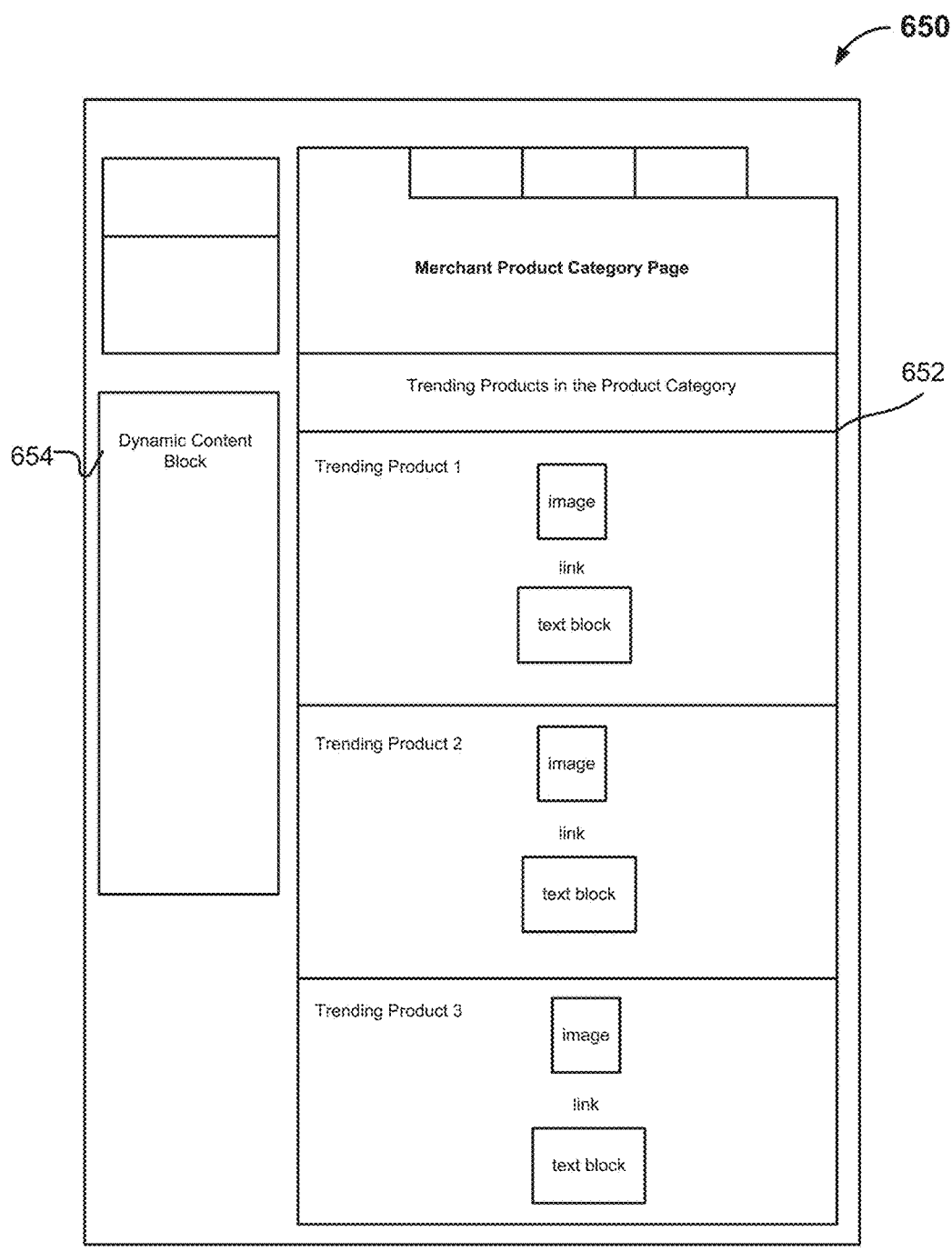

FIGS. 6A-B illustrate example dynamic landing pages that include widgets that are populated with content identified using the disclosed techniques in accordance with some embodiments. In various embodiments, content (e.g., customized and/or dynamic content, including, for example, images, texts, links such as URL/URI links, and/or other static or dynamic web page content) can be published on a dynamic landing page in any appropriate manner, including in-line with previously existing content and/or separately via one or more dedicated widgets.

In one embodiment, widgets are dynamically populated and rendered using various techniques disclosed herein. In one embodiment, a proxy of an existing web page of a merchant web site is used to generate a new, customized version (e.g., proxy) of that web page that is a new dynamic landing page that is configured to be targeted for a given online marketing/ad campaign for the merchant web site.

In one embodiment, dynamic content blocks are used to allocate a portion of the web page of the dynamic landing page for populating with dynamic content. For example, a widget can be configured to populate a given dynamic content block with on sale items that are targeted for a given product/brand associated with the online marketing/ad campaign (e.g., if the online ad campaign is for dresses, then the merchant's on sale dresses can be displayed in the dynamic content block, etc.). As another example, a widget can be configured to populate a given dynamic content block with user relevant items based on a user context including user behavior signals and that are also targeted for a given product/brand associated with the online marketing/ad campaign (e.g., if the online ad campaign is for running sneakers and the user's browsing history indicates that the user recently viewed Asics® running sneakers, then the merchant's top selling Asics® sneakers can be displayed in the dynamic content block, etc.).

Referring to FIG. 6A, a proxy of a merchant home page is providing as a dynamic landing page 600. In this example, the proxy of the merchant home page is configured to display products associated with a given brand as shown at 602. For example, a list of products that match that product brand can be presented on the dynamic landing page as shown. A dynamic content block 604 is also provided as shown. In an example implementation, a dynamic content block can be populated with dynamic content using one or more widgets, which can be dynamically populated with customized content using various techniques disclosed herein.

Referring to FIG. 6B, a proxy of a merchant product category page is providing as a dynamic landing page 650. In this example, the proxy of the merchant product category page is configured to display trending products associated with a given product category as shown at 652. For example, a list of trending products that are in that product category can be presented on the dynamic landing page as shown. A dynamic content block 654 is also provided as shown. In an example implementation, a dynamic content block can be populated with dynamic content using one or more widgets (e.g., newly offered products in the merchant product category can be displayed using a widget to populate the content for the dynamic content block), which can be dynamically populated with customized content using various techniques disclosed herein.

In one embodiment, the different dynamic landing pages of FIGS. 6A-B can both be associated with a given online marketing/ad campaign for a merchant's web site or with a specific channel, traffic source, or based on other user context. For example, for a given destination URI associated with the given online marketing/ad campaign for the merchant's web site, the DLP selector (e.g., DLP selector engine, such as described above) can be configured to select among these two different dynamic landing pages. As an example, initially a 50/50 allocation can be implemented using the DLP selector. As another example, in some cases, the DLP selector can also be configured to select dynamic landing page 650, for example, if a repeat user had previously been returned dynamic landing page 600 in a previous destination URI request associated with that same user, such as in a previous session or the same session. As yet another example, the DLP selector can be configured to select different dynamic landing pages based on a user context, such as selecting different landing pages for male versus female users for a given online ad campaign, for users of a different geography, based on a user's browsing history, and/or other user contexts.

Performance of these two different dynamic landing pages can be tracked and reported on using the performance analytics, such as described above. In an example use case, after a predetermined period of time or threshold performance metric is reached, then the better performing dynamic landing page (e.g., based on configured/selected criteria/metrics, such as visits, Add-To-Carts, Conversion Rate, Revenue per Visit, and/or other criteria/metrics) can be configured as the default/only dynamic landing page that is to be used for the given online marketing/ad campaign for the merchant's web site. In this example, an automated feedback mechanism applies performance measurements for different dynamic landing pages based on A/B comparative testing results, to automatically select an optimal dynamic landing page for a given online ad campaign to improve results for the online ad campaign for the merchant's e-commerce web site.

The example dynamic landing pages of FIGS. 6A-B illustrate examples of different dynamic landing pages. As will now be apparent, various other forms and customized versions of dynamic landing pages can be configured using the disclosed techniques. For example, dynamic landing pages can be customized for targeted online ad campaigns by selecting and modifying existing web pages of a merchant's web site and/or creating new web pages (e.g., using a "look and feel" of the existing merchant web pages), to promote certain products and/or brands associated with the targeted online ad campaigns, to insert banners on the dynamic landing page, to personalize dynamic landing pages based on the user context, and/or to target and personalize a user experience with targeted and/or dynamic content (e.g., using widgets to dynamically populated content in dynamic content blocks configured for the dynamic landing page). These and other examples of dynamic landing pages for improving online ad campaigns for e-commerce web sites will now be further described below.

Example Use Case Scenarios for Dynamic Landing Pages for Improving Online Ad Campaigns for E-Commerce Web Sites Example use case scenarios for dynamic landing pages include paid search use cases, in which dynamic landing pages can be generated and returned in response to destination URIs for online ads that are provided as paid search results. In particular, performance analytics, such as described above, for a given merchant web site can be used to provide insights that can facilitate a configuration of a more targeted and customized dynamic landing page that can improve online ad campaigns for e-commerce web sites, such as the merchant web site for a given online ad campaign. For a marketer or site experience manager, this use case can be enabled end-to-end in a single WYSIWYG interface, without the help of IT.

As an example for using dynamic landing pages to improve a non-branded online ad campaign for paid search, a non-branded online ad campaign can be improved by identifying good landing page candidates, such as by selecting a particular landing page among highly co-viewed web pages (e.g., of the relevant merchant web site) for an online ad campaign. As another example for using dynamic landing pages to improve the non-branded online ad campaign for paid search, if users are navigating away from a current landing page (e.g., the current landing page for the existing non-branded online ad campaign) to a (sub)category page(s) on the merchant web site, such as for head terms, then a new personalized dynamic category(ies) can be added to the current landing page for the non-branded online ad campaign, such a personalized dynamic category facilitates users' navigation. As yet another example for using dynamic landing pages to improve the non-branded online ad campaign for paid search, products with high RPV from organic web traffic but low visits from marketing channels (e.g., via ad links) can be identified to identify high performing products for the non-branded online ad campaign, and a dynamic landing page can be configured for the non-branded online ad campaign to include a relevant products widget that dynamically populates the enhanced dynamic landing page with such high performing products. As yet another example for using dynamic landing pages to improve the non-branded online ad campaign for paid search, products for a given product category that are gaining popularity (e.g., possibly due to seasonal or fashion trends) can be identified to identify trending products for the given product category for the non-branded online ad campaign, and a dynamic landing page can be configured for the non-branded online ad campaign to include a trending products widget that dynamically populates the enhanced dynamic landing page with such trending products for the given product category.

As an example to grow the non-branded online ad campaign for paid search by expanding keywords or increasing bids based on trending intent, top site search queries that represent user intent can be identified and top tags of converting and trending products can be identified, and new keywords or online ad campaigns can be created and launched, and a dynamic landing page can be configured for the non-branded online ad campaign for such new keywords or online ad campaigns.

As an example for using dynamic landing pages to improve a branded online ad campaign for paid search, a branded online ad campaign can be improved by identifying underperforming branded online ad campaigns and/or underperforming landing pages (e.g., especially for a branded broad match that is commonly associated with a broad and general landing page, such as the web site's home page), and add personalization widgets (e.g., a widget that provides just for your products to return products based on user context, a dynamic categories widget dynamically generates categories based on user context that may not be existing categories on the merchant web site) to dynamic landing pages for the branded online ad campaign.

As an example for using dynamic landing pages for a new online ad campaign for paid search, top web pages of the merchant web site (e.g., most viewed) and top products (e.g., most viewed and/or most purchased) that are most related to the new online ad campaign can be identified, and a dynamic landing page can be configured for the new online ad campaign to include selected and assembled content from such top web pages and top products.

Another example use case scenario for dynamic landing pages includes promotion electronic communications (e.g., email or other electronic mail communications) use cases, in which dynamic landing pages can be generated and returned in response to destination URIs for electronic ads that are provided in such promotion electronic communications.

As an example for using dynamic landing pages for a new online ad campaign for email, top category web pages of the merchant web site based on organic search or direct channel performance can be identified, and a dynamic landing page can be configured for the new online ad campaign to include selected and assembled content from such top category web pages, existing landing pages can also be assessed, and/or A/B testing of different dynamic landing pages can be performed using techniques disclosed herein. As another example for using dynamic landing pages for a new online ad campaign for email, top performing historical campaign promotions can be identified, and A/B testing of different dynamic landing pages can be performed to test different promotions and assess impact to performance of the online ad campaign using techniques disclosed herein. As an example for using dynamic landing pages for a new category or a brand online ad campaign for email, high RPV products within a category or brand can be identified (e.g., based on cross-channel data) and high performing products from a historical email campaign can also be identified, and a dynamic landing page can be configured to include a relevant products widget. As an example for using dynamic landing pages for a new online ad campaign for email to personalize products and dynamic category navigation on a landing page, a dynamic landing page can be configured to include a dynamic categories widget for personalized browsing and a just for you products widget based on behavioral data and machine learning techniques based on such behavioral data, which can be applied to dynamic landing pages, for example, generic email promotion/ad blast campaigns or trigger email promotion/ad campaigns.

As will now be apparent, performance analytics, such as described above, for a given merchant web site can be used to provide insights that can also facilitate insights for online marketers or site experience managers to determine how to most effectively (e.g., based on return on investment (ROI), etc.) promote content and products on the web site, and through various online marketing channels, such as paid advertising, paid search, social networking, and/or other online marketing channels and using the disclosed dynamic landing pages techniques.

Example Processes for Web Sites Providing Dynamic Landing Panes

Figure 7:
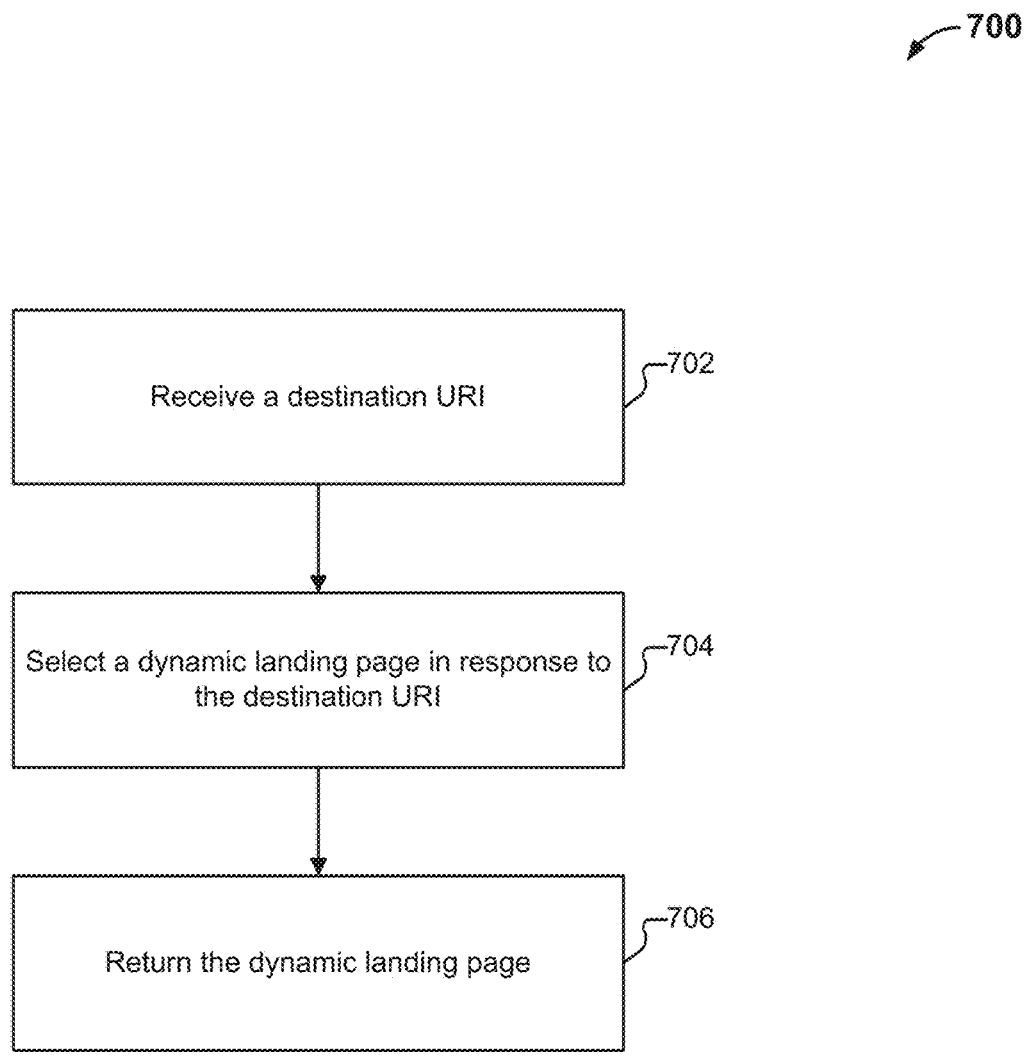
FIG. 7 is a flow diagram illustrating a process for providing dynamic landing pages in accordance with some embodiments.

FIG. 7 is a flow diagram illustrating a process for providing dynamic landing pages in accordance with some embodiments. In one embodiment, a process 700 is performed by a dynamic landing pages system, such as described above with respect to FIGS. 1-5.

The process begins at 702. At 702, a destination URI (e.g., associated with an online advertisement (ad) campaign, channel, traffic source, or set of users) is received. For example, an ad link can be received based on a user clicking through an online ad, such as a paid search ad on a search engine web site, a paid online ad on a third party web site, and/or an online ad in a promotion email or other electronic communication.

At 704, a dynamic landing page is selected in response to the destination URI. For example, a proxy service, such as described above, can select the dynamic landing page (e.g., using a dynamic selector engine, which can be configured to select dynamic landing pages based on the destination URI and, in some cases, additional criteria, such as user context, A/B testing, etc., such as described above).

At 706, the dynamic landing page is returned. For example, the dynamic landing page can be returned for presentation on a user's browser executed on the user's client/computing device.

Figure 8:
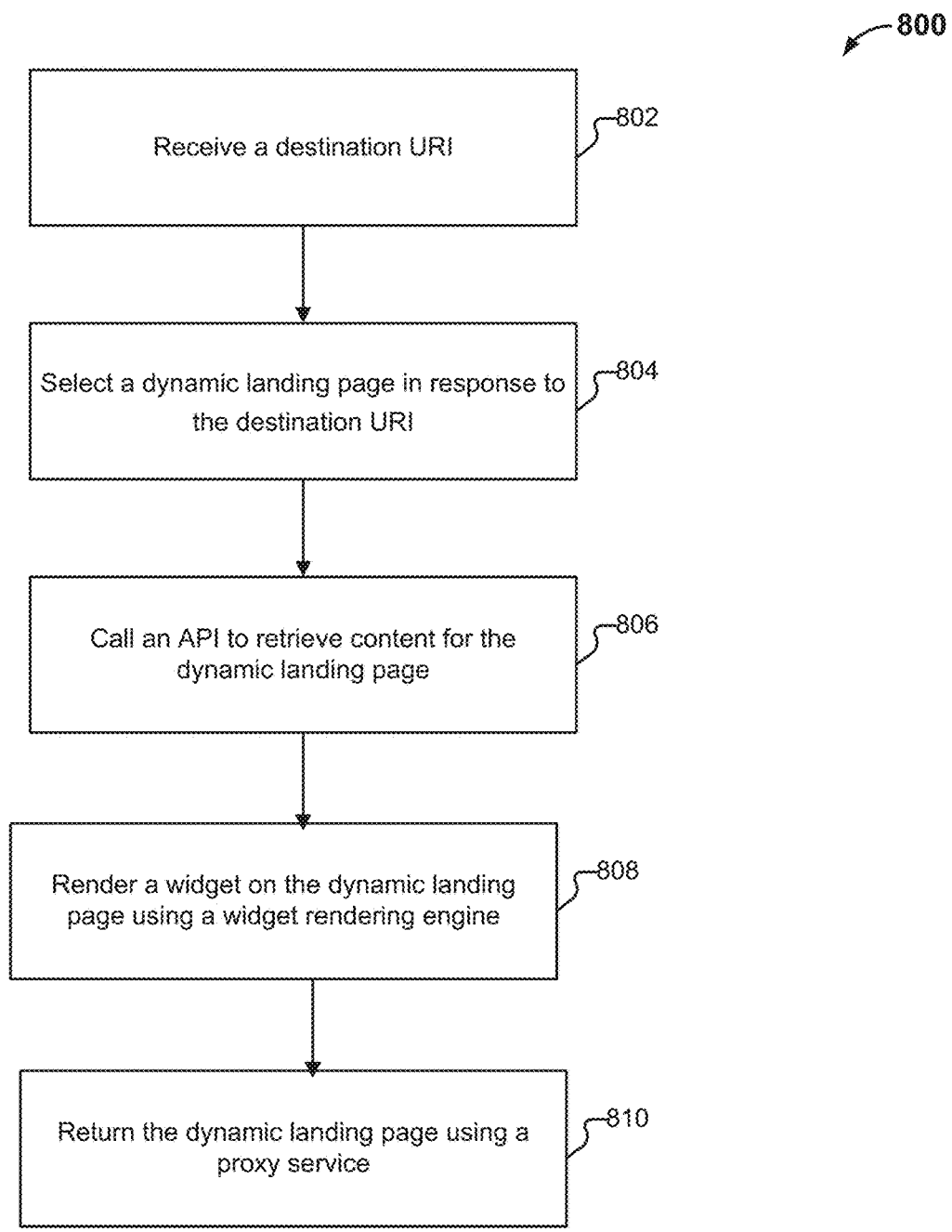
FIG. 8 is another flow diagram illustrating a process for providing dynamic landing pages in accordance with some embodiments.

FIG. 8 is another flow diagram illustrating a process for providing dynamic landing pages in accordance with some embodiments. In one embodiment, a process 800 is performed by a dynamic landing pages system, such as described above with respect to FIGS. 1-5.

The process begins at 802. At 802, a destination URI (e.g., associated with an online advertisement (ad) campaign, channel, traffic source, or set of users) is received. For example, an ad link can be received based on a user clicking through an online ad, such as a paid search ad on a search engine web site, a paid online ad on a third party web site, and/or an online ad in a promotion email or other electronic communication.

At 804, a dynamic landing page is selected in response to the destination URI. For example, a proxy service, such as described above, can select the dynamic landing page (e.g., using a dynamic selector engine, which can be configured to select dynamic landing pages based on the destination URI and, in some cases, additional criteria, such as user context, A/B testing, etc., such as described above).

At 806, an API is called to retrieve content for the dynamic landing page. For example, a DLP API layer can be called by the proxy service to respond to an API call(s) and for interacting with the data storage layer, such as described above with respect to FIG. 4.

At 808, a widget is rendered on the dynamic landing page. For example, the widget can be rendered using a widget rendering engine, such as described above with respect to FIG. 4.

At 810, the dynamic landing page is returned. For example, the dynamic landing page can be returned for presentation on a user's browser executed on the user's client/computing device.

Example User Interface Flow for Dynamic Landing Panes

An example user interface flow for dynamic landing pages will now be described with respect to FIGS. 9-24. The WYSIWYG interface is illustrated in these example screen shots that facilitate an easy-to-use and intuitive user interface for configuring, customizing, and identifying opportunities related to web pages for providing dynamic landing pages that can be associated with online ad campaigns as further described below.

Figure 9:
FIG. 9 illustrates an embodiment of a screen shot that provides performance analytics for online ad campaigns.

FIG. 9 illustrates an embodiment of a screen shot that provides performance analytics for online ad campaigns. For example, a detailed view identifies visits, Add-to-Cart (ATC), revenue, ATC rate (%), conversion rate (%), and conversion performance metrics for different online ad campaigns for a merchant web site.

Figure 10:
FIG. 10 illustrates an embodiment of a screen shot that provides performance analytics for online ad campaigns and an annotate action and take action menu.

FIG. 10 illustrates an embodiment of a screen shot that provides performance analytics for online ad campaigns and an annotate action and take action menu. For example, the annotate action and take action menu provides action options including more insights, products viewed along with this product, queries that led to this product, performance segmented by channel, and performance segmented by device (e.g., user client/computing device).

Figure 11:
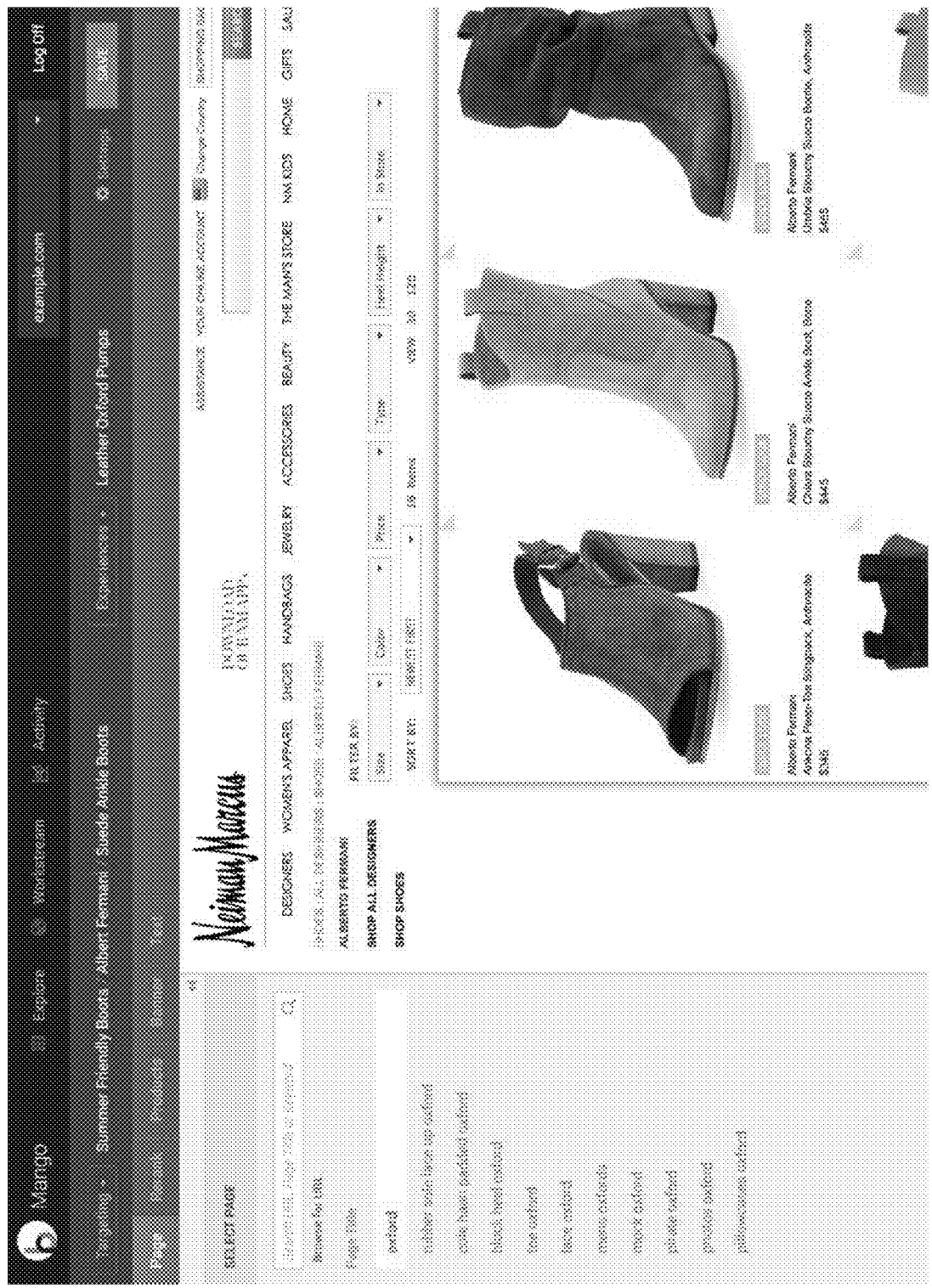
FIG. 11 illustrates an embodiment of a screen shot of a dynamic landing page for an online ad campaign.

FIG. 11 illustrates an embodiment of a screen shot of a dynamic landing page for an online ad campaign. In this example, the dynamic landing page is targeting a landing page for a summer friendly boots online ad campaign. From the analytics screen shot for online ad campaigns, a marketer can easily take action on an insight from the analytics, by taking an action to manage and configure a dynamic landing page, as shown in this example.

Figure 12:
FIG. 12 illustrates an embodiment of a screen shot of a dynamic landing page for an online ad campaign that can be configured using a targeting menu and experience menu.

FIG. 12 illustrates an embodiment of a screen shot of a dynamic landing page for an online ad campaign that can be configured using a targeting menu and experience menu. For example, the targeting menu can configure the dynamic landing page to be associated with a particular AdGroup (e.g., summer friendly boots), Campaign (e.g., Albert Fermani®), and Keyword (e.g., suede ankle boots). In addition, the experience menu allows the dynamic landing page to be customized to show 50% Leather Oxford Pumps and 50% Red Oxford Shoes in an A/B test, for the defined targeting criteria, as shown in this example.

Figure 13:
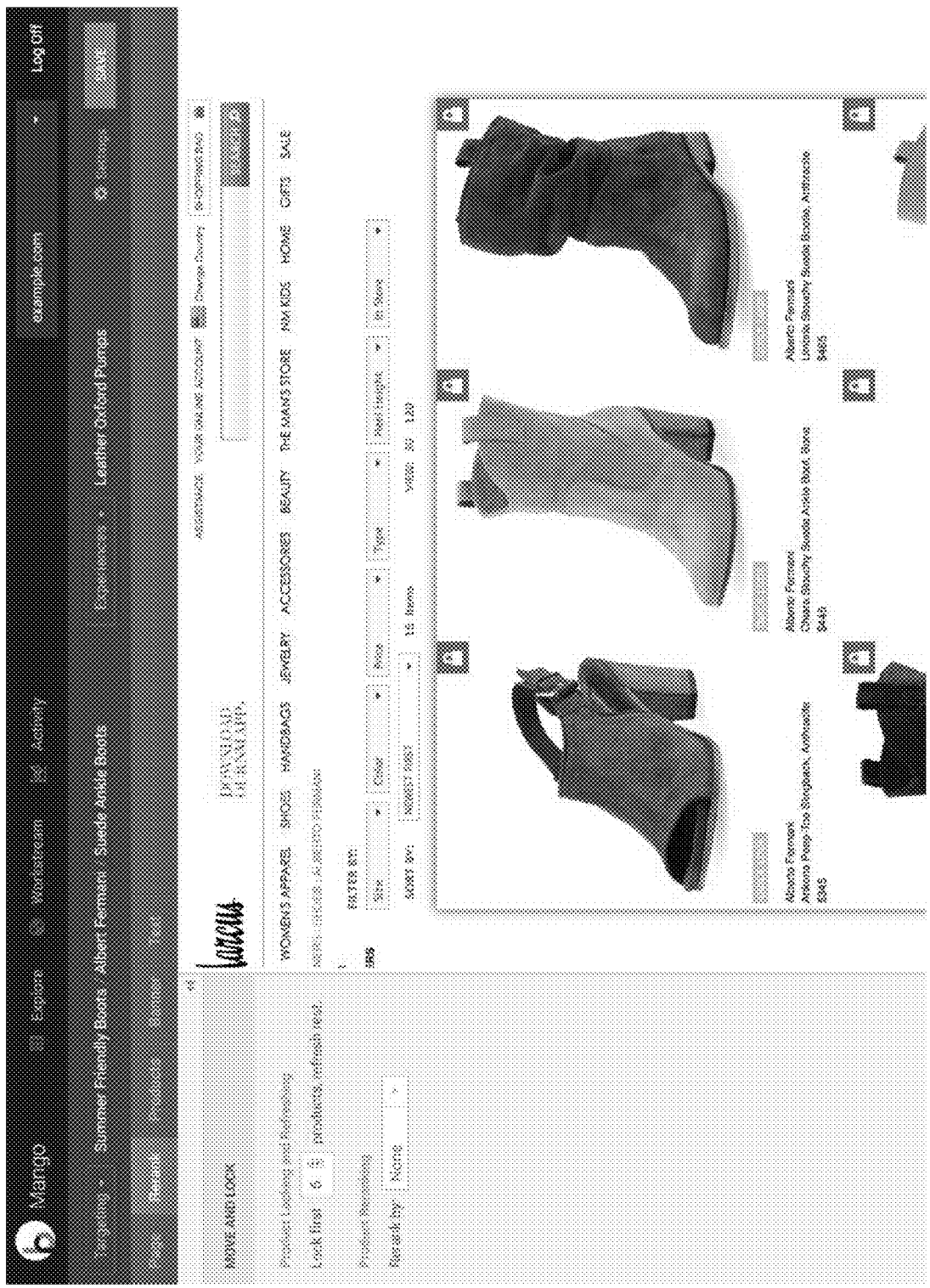
FIG. 13 illustrates an embodiment of a screen shot of a dynamic landing page for an online ad campaign that can be configured using a move and lock menu.

FIG. 13 illustrates an embodiment of a screen shot of a dynamic landing page for an online ad campaign that can be configured with a re-rank widget, to define the products displayed on a dynamic landing page, using a move and lock menu and by dragging-and-dropping products within the page. For example, the move and lock menu can be used to configure that the products shown in the first N positions on the page should always be locked and static (e.g., N=6 products in this example) and display the rest of the unlocked products according to a product re-ranking option (e.g., criteria by which products can be re-ranked, in this example, none is selected).

Figure 14:
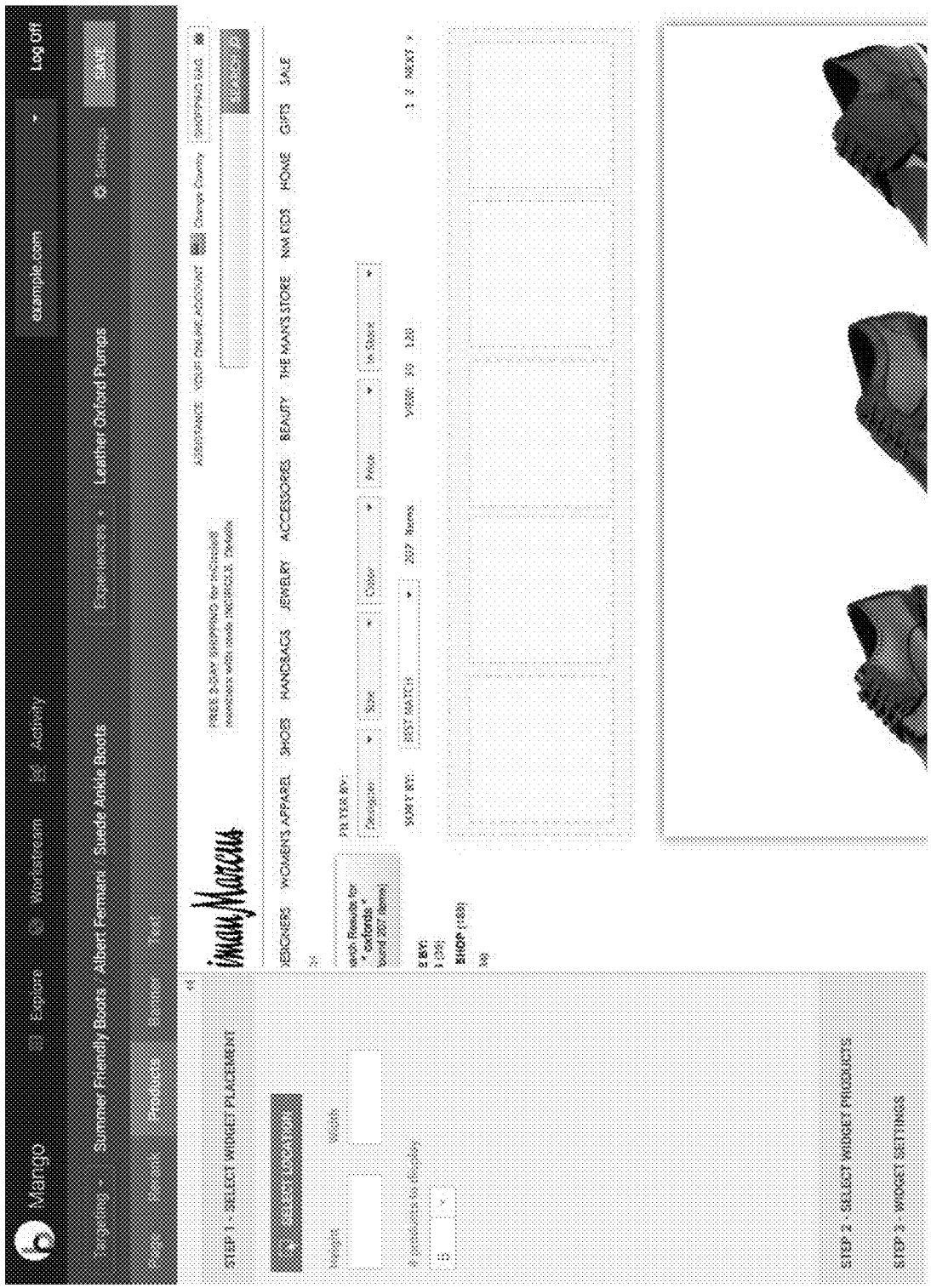
FIG. 14 illustrates an embodiment of a screen shot of a dynamic landing page for an online ad campaign that includes a select widget placement menu.

FIG. 14 illustrates an embodiment of a screen shot of a dynamic landing page for an online ad campaign that includes a select widget placement menu, to configure a products widget. For example, the select widget placement menu allows a user to select a location on the web page, to select a size (e.g., height and width), and to select a number of products to be displayed by the widget on the dynamic landing page. The location of where the widget should appear on the landing page can be selected through a WYSIWYG interface by clicking a location on the page.

Figure 15:
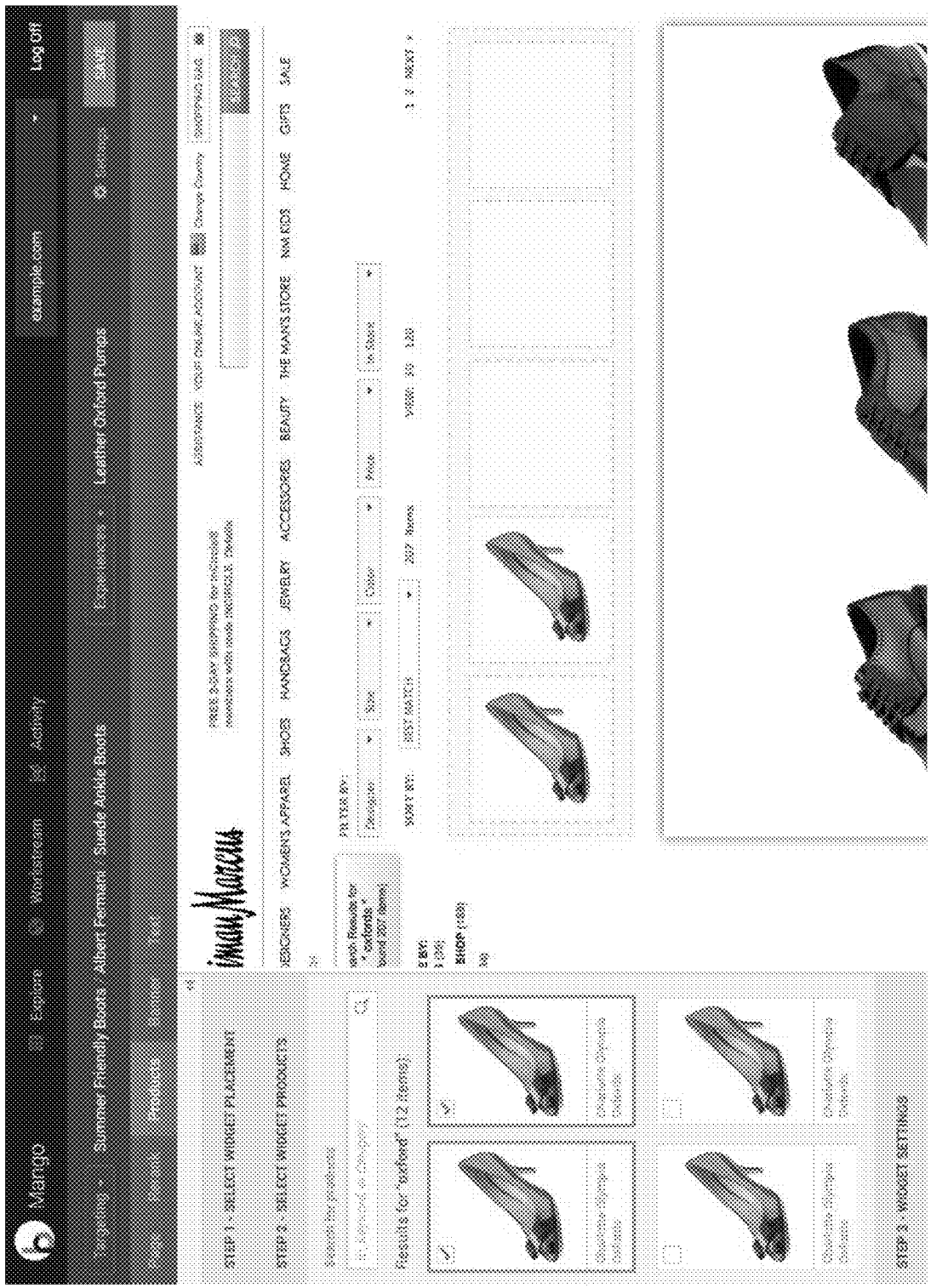
FIG. 15 illustrates an embodiment of a screen shot of a dynamic landing page for an online ad campaign that includes a select widget products menu.

FIG. 15 illustrates an embodiment of a screen shot of a dynamic landing page for an online ad campaign that includes a select widget products menu. For example, the select widget products menu allows a user to search for products and to select which products to be displayed by the widget on the dynamic landing page.

Figure 16:
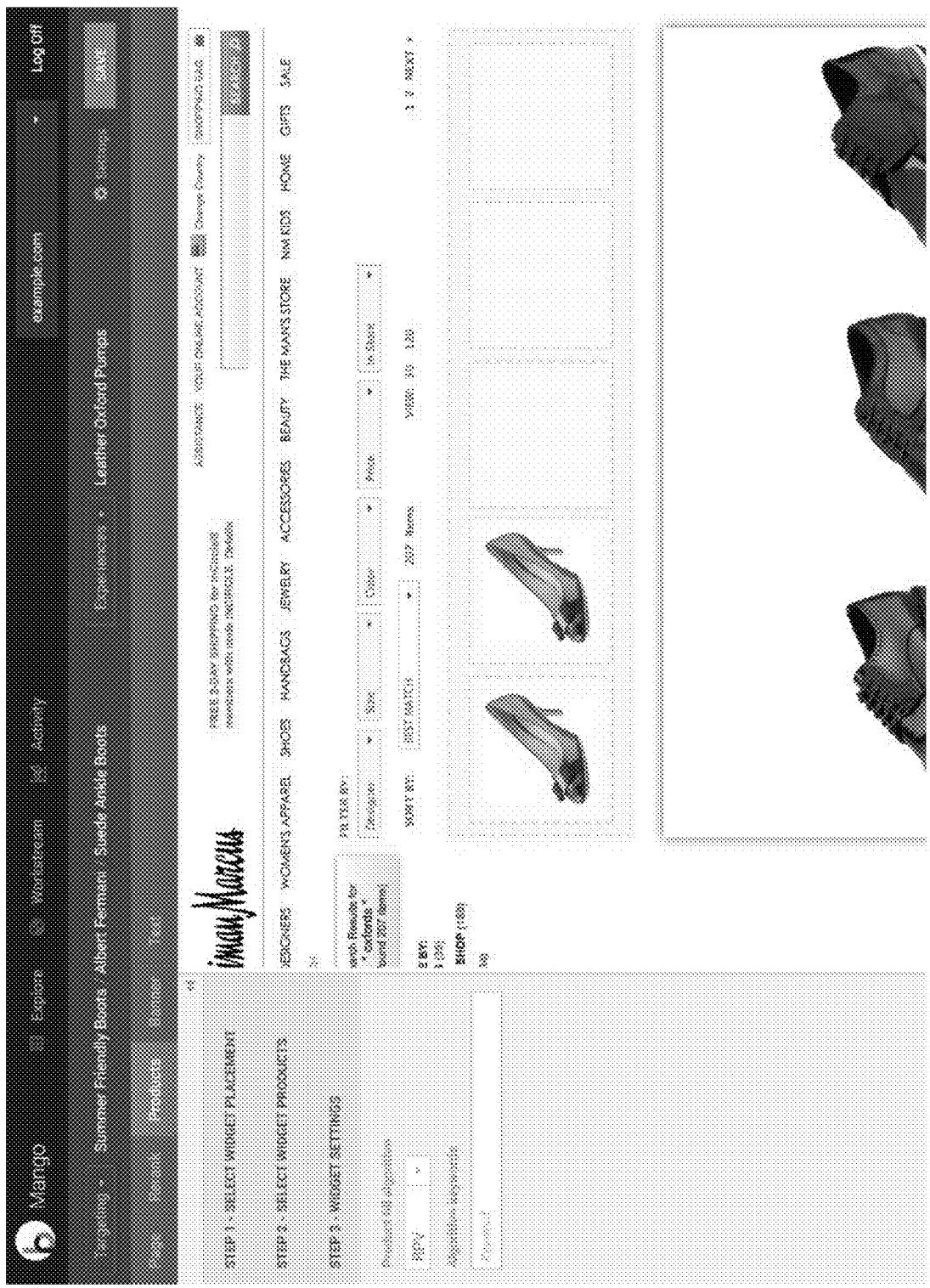
FIG. 16 illustrates an embodiment of a screen shot of a dynamic landing page for an online ad campaign that includes a widget settings menu.

FIG. 16 illustrates an embodiment of a screen shot of a dynamic landing page for an online ad campaign that includes a widget settings menu. For example, the widget settings menu allows a user to select a product fill algorithm (e.g., based on RPV of the products as shown in this example, or other product fill algorithms) used to select the displayed products in the widget and/or algorithm keywords that can be applied by the widget to dynamically select products to be displayed by the widget on the dynamic landing page.

Figure 17:
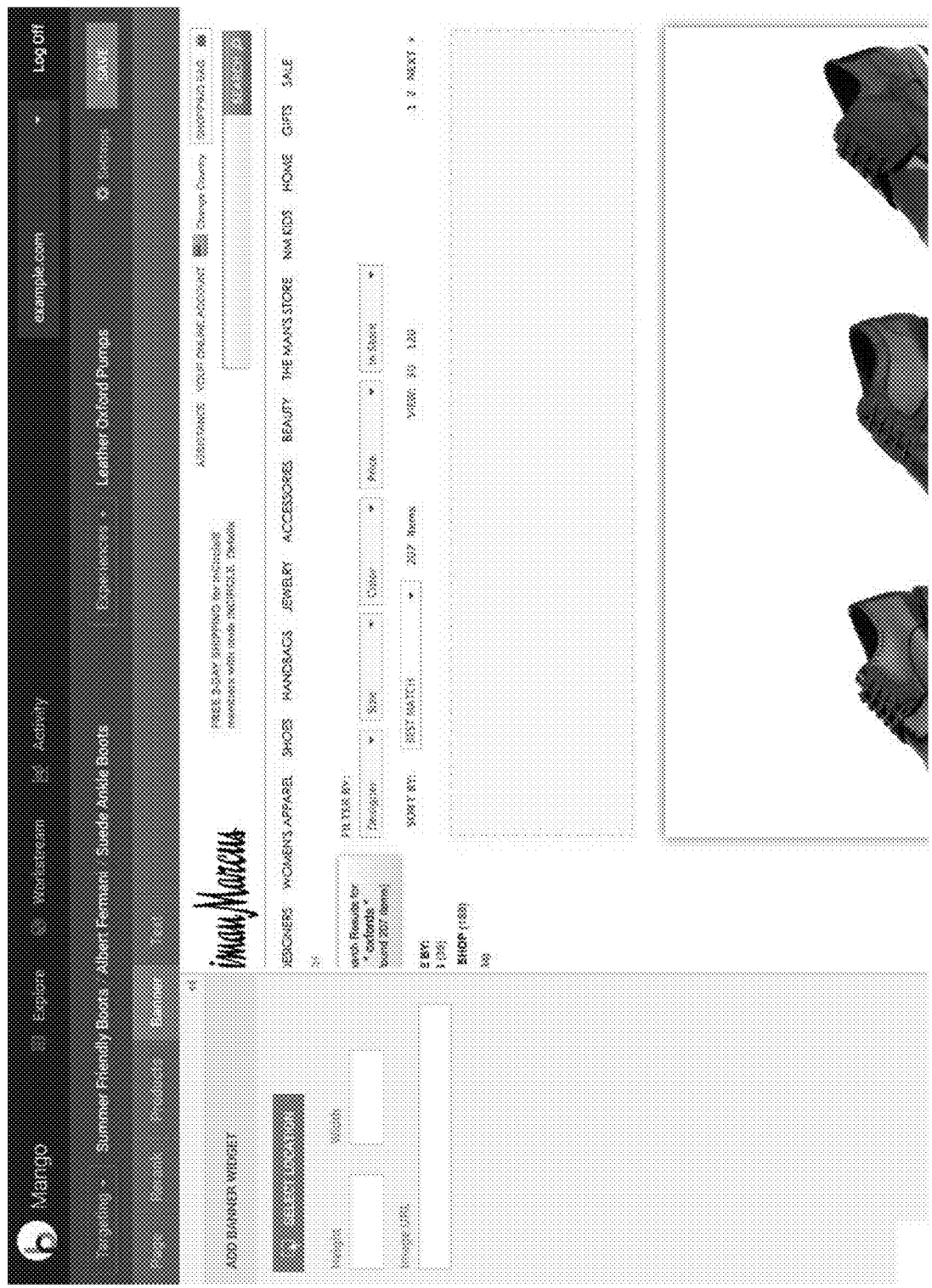
FIG. 17 illustrates an embodiment of a screen shot of a dynamic landing page for an online ad campaign that includes an add banner widget menu.

FIG. 17 illustrates an embodiment of a screen shot of a dynamic landing page for an online ad campaign that includes an add banner widget menu, to configure a banner widget. For example, the add banner widget menu allows a user to select a location on the web page, to specify a size (e.g., height and width) of the widget, and to select an image URL to be displayed by the banner widget on the dynamic landing page. The location of the widget can be selected through a WYSIWYG interface by clicking a location on the page.

Figure 18:
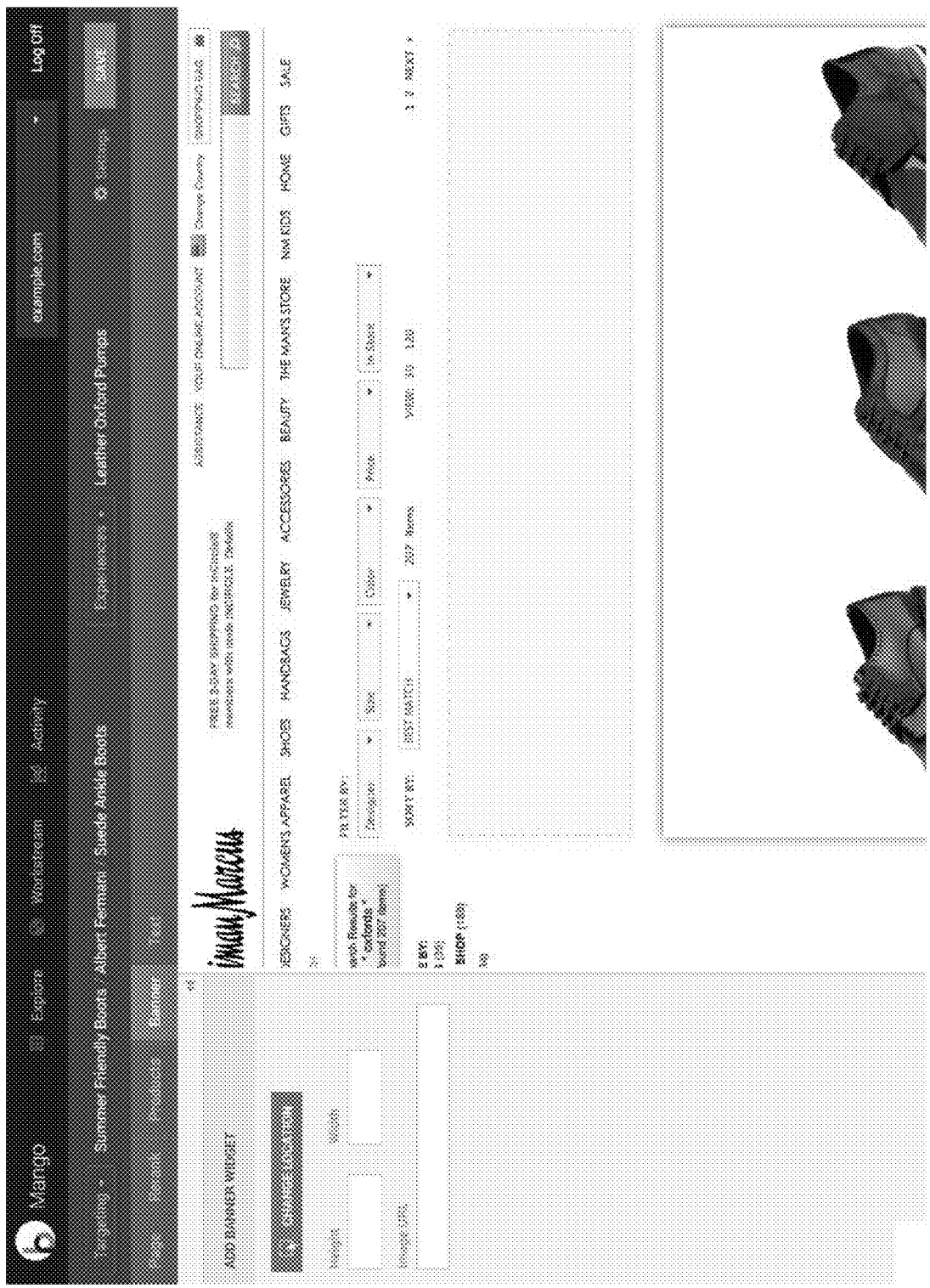
FIG. 18 illustrates an embodiment of another screen shot of a dynamic landing page for an online ad campaign that includes an add banner widget menu.

FIG. 18 illustrates an embodiment of another screen shot of a dynamic landing page for an online ad campaign that includes an add banner widget menu. In this example, the add banner widget menu allows a user to change a location on the web page, to select a size (e.g., height and width), and to select an image URL to be displayed by the banner widget on the dynamic landing page. The changed location of the widget can be selected through a WYSIWYG interface by clicking a location on the page.

Figure 19:
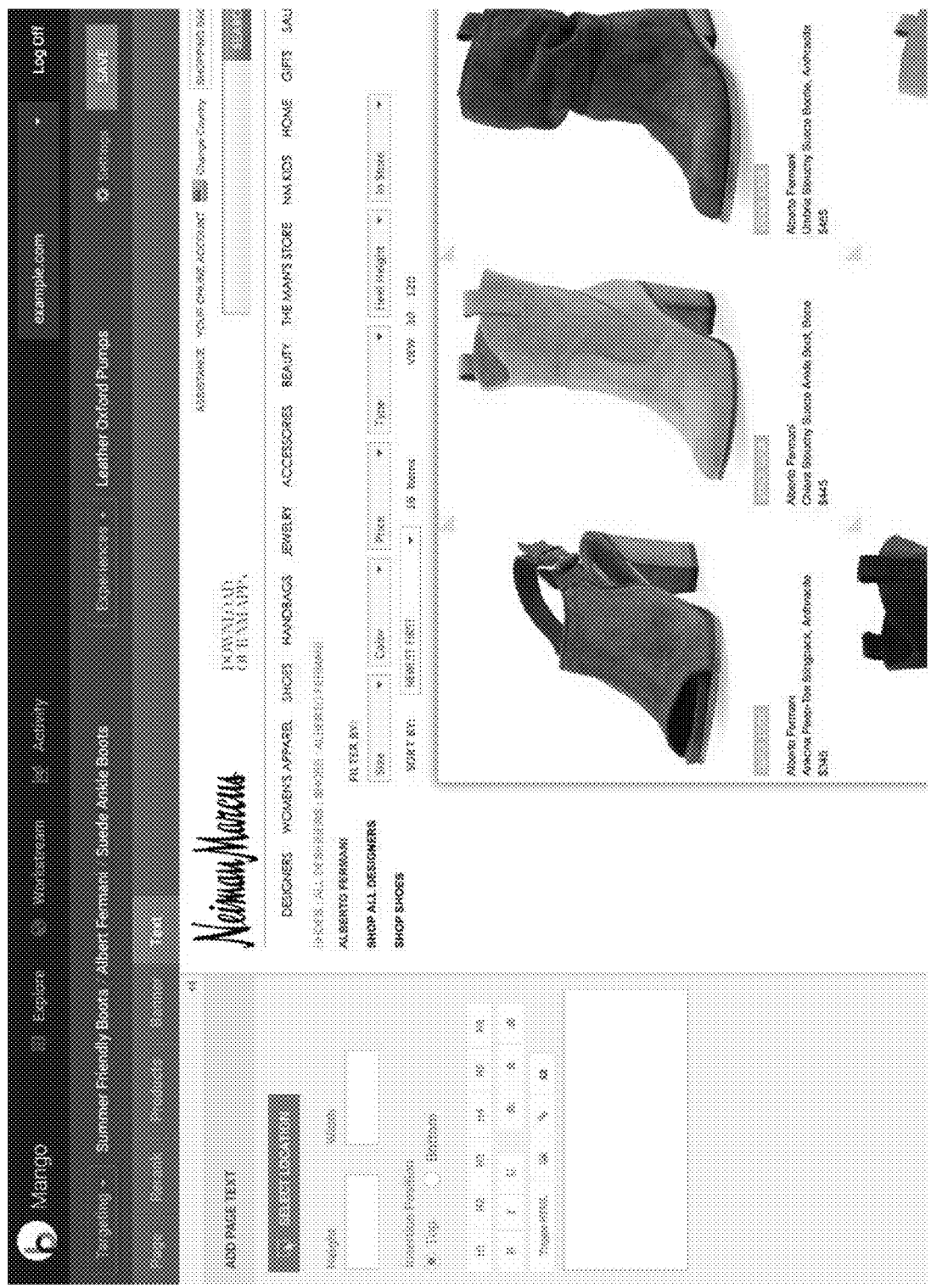
FIG. 19 illustrates an embodiment of a screen shot of a dynamic landing page for an online ad campaign that includes an add page text menu.

FIG. 19 illustrates an embodiment of a screen shot of a dynamic landing page for an online ad campaign that includes an add page text menu to configure a text widget. For example, the add page text menu allows a user to select a location on the web page, to select a size (e.g., height and width), to insert a position, to type in the text to be displayed on the dynamic landing page, and to set the style and formatting of the text. The location of the widget can be selected through a WYSIWYG interface by clicking a location on the page. Also, instead of inserting stylized and formatted text, HTML, videos, or links can be inserted into and displayed in the widget.

Figure 20:
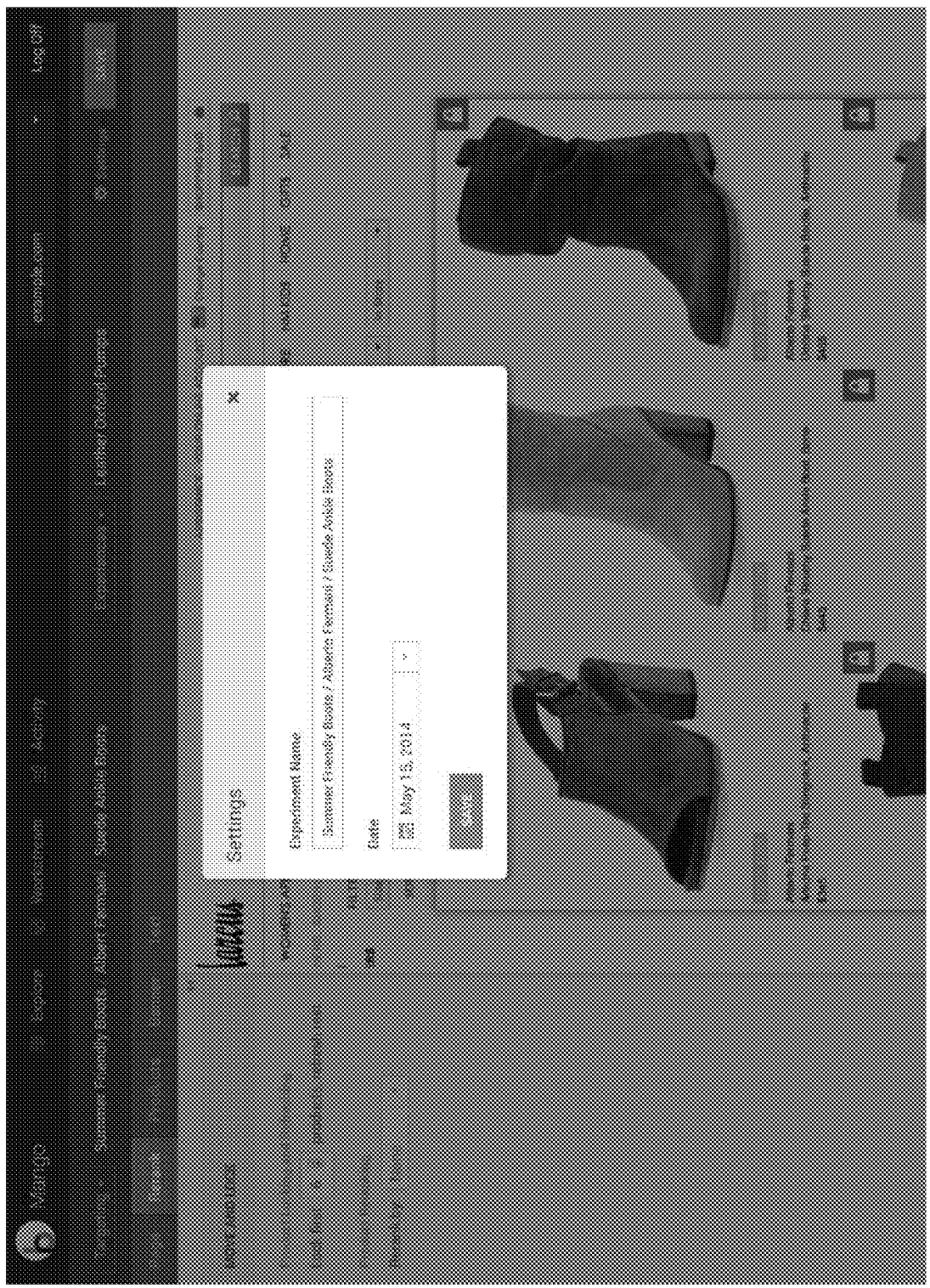
FIG. 20 illustrates an embodiment of a screen shot of a dynamic landing page for an online ad campaign that includes a settings menu.

FIG. 20 illustrates an embodiment of a screen shot of a dynamic landing page for an online ad campaign that includes a settings menu. For example, the settings menu allows a user to select a name for the dynamic landing page (e.g., for the experiment for the newly configured and customized dynamic landing page) and a date of the new landing page.

Figure 21:
FIG. 21 illustrates an embodiment of a screen shot that provides an activity overview based on performance analytics for a dynamic landing page.

FIG. 21 illustrates an embodiment of a screen shot that provides an activity overview based on performance analytics for dynamic landing page. For example, the activity overview shows a table that includes fields for each monitored dynamic landing page, in which the fields include a live date, a user name (e.g., creator of the dynamic landing page), an action, a type, and a trend.

Figure 22:
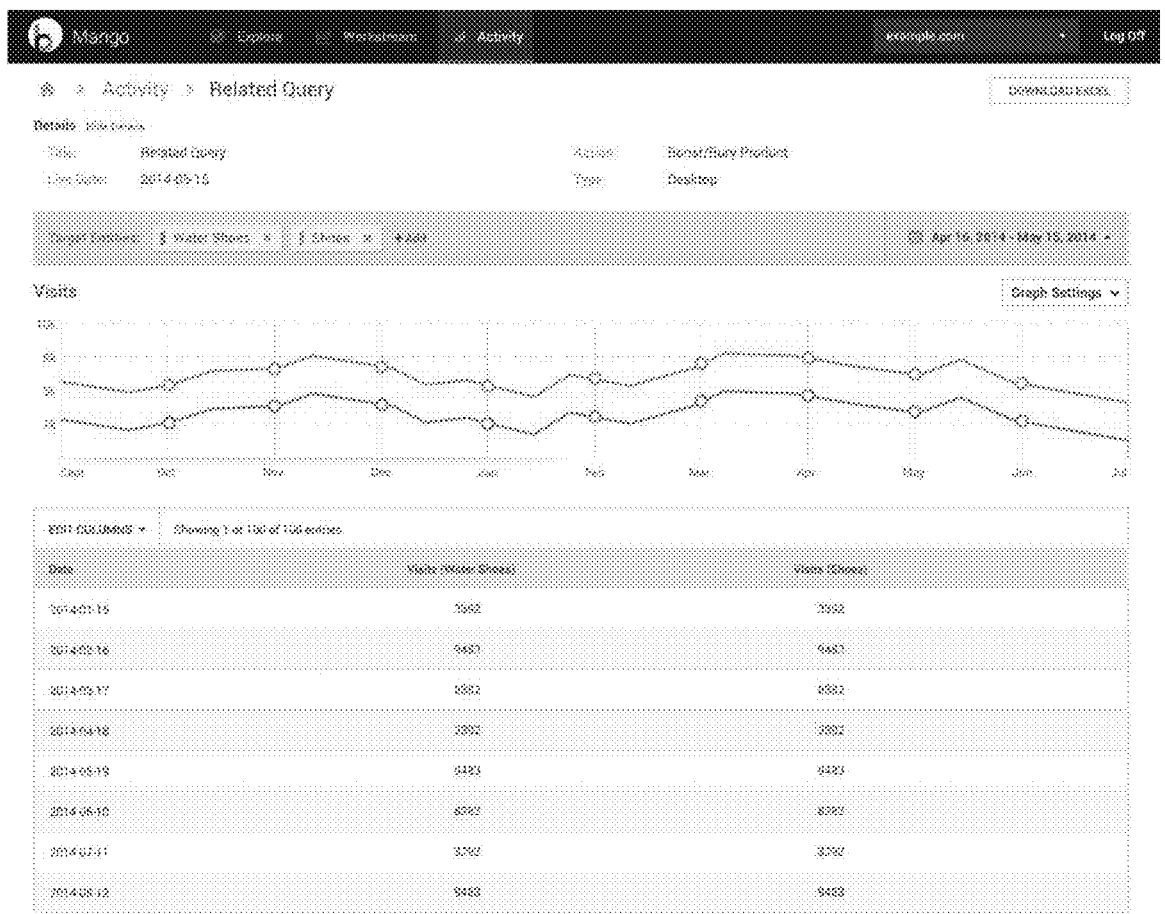
FIG. 22 illustrates an embodiment of a screen shot that provides an activity overview based on performance analytics for a dynamic landing page.

FIG. 22 illustrates an embodiment of a screen shot that provides a detailed performance analytics view for one or more dynamic landing pages, which could also be in an A/B test. For example, the detailed view shows a graph of the number of visits to the related query dynamic landing page over time (e.g., by month). Instead of visits, other key metrics such as ATC, RPV, or Conversion Rate can be selected for display in the graph and table, and used for comparison of dynamic landing pages in an A/B test.

Figure 23:
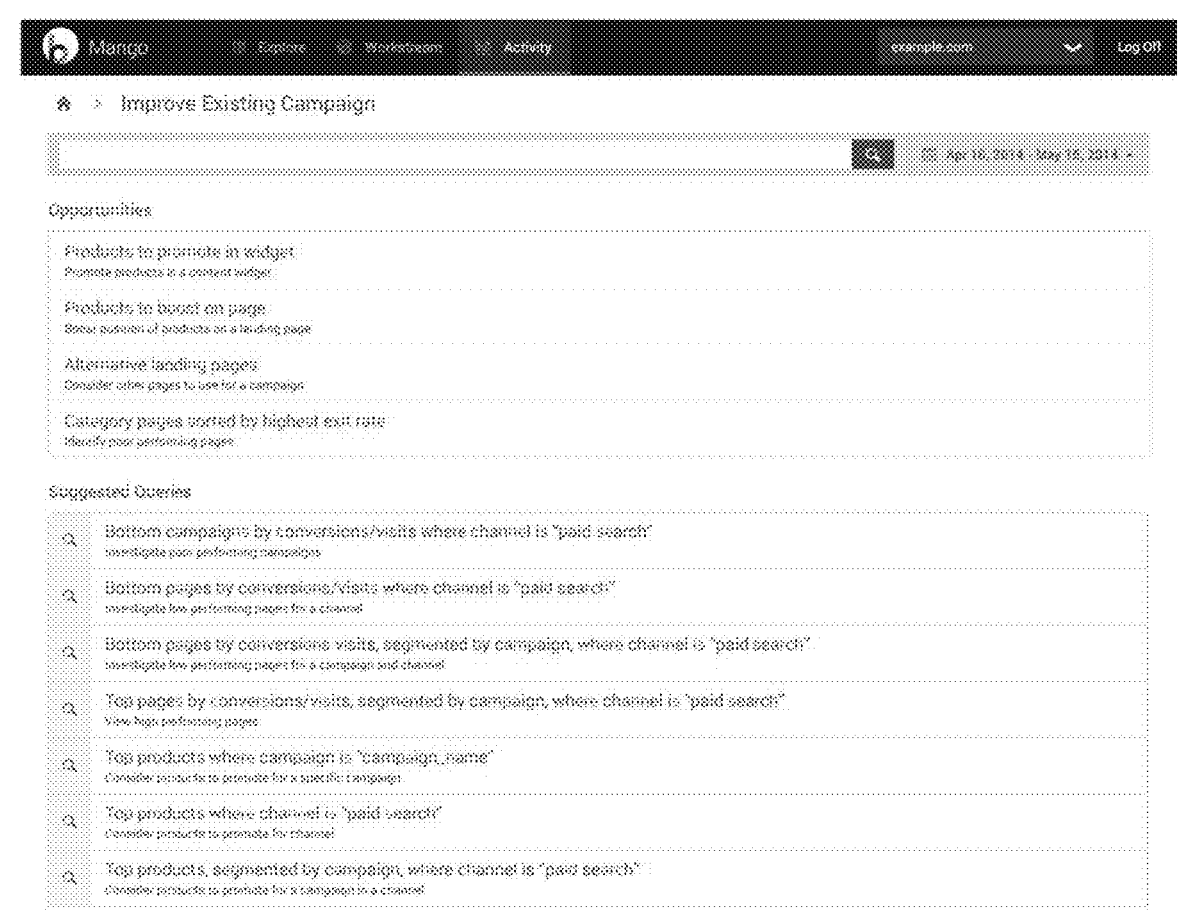

FIG. 23 illustrates an embodiment of a screen shot that provides opportunities for configuring a dynamic landing page to improve an existing online ad campaign. For example, the opportunities that can be selected for configuring a dynamic landing page to improve an existing online ad campaign are shown as follows: product to promote in a widget, products to boost on the dynamic landing page, alternative dynamic landing pages, and category pages sorted by highest exit rate. As also shown, suggested queries that are helpful for improving an existing online campaign are presented on this example screen shot (e.g., to identify bottom performing campaigns, bottom performing web pages, top performing web pages, top performing products by campaign, by paid search channel, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for dynamic landing pages, comprising: a processor; and
a memory coupled with the processor, wherein the memory is configured to provide the processor with instructions which when executed cause the processor to:
selecting at least one content to be displayed by a dynamic landing page and which of at least two dynamic landing pages to display in response to a request for a destination Uniform Resource Indicator (URI) of a web site using a dynamic selector engine, wherein the selecting is based at least on information associated with the request for the destination URI;
inject at least one dynamic content block to the selected dynamic landing page, the at least one dynamic content block including a widget configured to
re-rank a plurality of items displayed in the at least one dynamic content block from a previous display based on a set of criteria, the set of criteria including revenue generated, conversion rate, user preferences, user behavioral data, total views, a channel from which a visitor arrives at the dynamic landing page, or any combination thereof, comprising to:
select items of the plurality of items to be locked and shown in first N positions using a user interface, N being 1 or larger, wherein selected locked items are not refreshed; and
refresh and display remaining unlocked items of the plurality of items in positions according to a re-ranking option; and
return the dynamic landing page using a proxy service.

2. The system recited in claim 1, wherein the dynamic landing page is a web page that is returned in response to the request for the destination URI, and wherein the web page includes customized content that is targeted for a campaign, channel, source, and/or user.

3. The system recited in claim 1, wherein the dynamic landing page is a web page that is returned in response to the request for the destination URI, and wherein the web page includes a widget that provides customized content for an online advertisement campaign that is associated with the destination URI to facilitate a targeted online advertisement campaign.

4. The system recited in claim 1, wherein the returning of the dynamic landing page comprises to:
receive the request for the destination URI of the web site from a referral URI.

5. The system recited in claim 1, wherein the returning of the dynamic landing page comprises to:
receive the request for the destination URI of the web site from a referral URI, wherein the destination URI is associated with an online advertisement campaign.

6. The system recited in claim 1, wherein the returning of the dynamic landing page comprises to:
return the dynamic landing page to a web browser executed on a user computing device.

7. The system recited in claim 1,
wherein the dynamic landing page is a web page, and wherein the widget provides customized content for the web page that is targeted for an online advertisement campaign that is associated with the destination URI.

8. The system recited in claim 1, wherein the selecting of the dynamic landing page comprises to:
dynamically select the dynamic landing page based on the destination URI, wherein the destination URI is associated with an online advertisement campaign.

9. The system recited in claim 1, wherein the selecting of the dynamic landing page comprises to:
dynamically select the dynamic landing page based on the destination URI and based on a user context, wherein the destination URI is associated with an online advertisement campaign.

10. The system recited in claim 1, wherein the selecting of the dynamic landing page comprises to:
dynamically select the dynamic landing page from a plurality of dynamic landing pages to perform A/B testing.

11. The system recited in claim 1, wherein the widget is further configured to perform the following:
configure A/B testing among two or more dynamic landing pages based on a set of criteria, the set of criteria including a referrer uniform resource locator (URL), a user agent, a geographic location, time of day, a channel, a campaign, a page URL, or any combination thereof, comprising to:
provide a first dynamic landing page including a first dynamic content block or a second dynamic landing page including a second dynamic content block depending on whether the set of criteria is associated with a first set of
criteria or a second set of criteria, respectively, the first dynamic content block being different from the second dynamic content block.

12. A method of dynamic landing pages, comprising:
selecting at least one content to be displayed by a dynamic landing page and which of at least two dynamic landing pages to display in response to a request for a destination Uniform Resource Indicator (URI) of a web site using a dynamic selector engine executed on a processor, wherein the selecting is based at least on information associated with the request for the destination URI;
injecting at least one dynamic content block to the selected dynamic landing page, the at least one dynamic content block including a widget configured to
re-rank a plurality of items displayed in the at least one dynamic content block from a previous display based on a set of criteria, the set of criteria including revenue generated, conversion rate, user preferences, user behavioral data, total views, a channel from which a visitor arrives at the dynamic landing page, or any combination thereof, comprising to:

select items of the plurality of items to be locked and shown in first N positions using a user interface, N being 1 or larger, wherein selected locked items are not refreshed; and refresh and display remaining unlocked items of the plurality of items in positions according to a re-ranking option; and returning the dynamic landing page using a proxy service.

13. The method of claim 12, wherein the dynamic landing page is a web page that is returned in response to the request for the destination URI, and wherein the web page includes customized content that is targeted for a campaign, channel, source, and/or user.

14. The method of claim 12, wherein the dynamic landing page is a web page that is returned in response to the request for the destination URI, and wherein the web page includes the widget that provides customized content for an online advertisement campaign that is associated with the destination URI to facilitate a targeted online advertisement campaign.

15. The method of claim 12, further comprising:
receiving the request for the destination URI of the web site from a referral URI, wherein the destination URI is associated with an online advertisement campaign.

16. The method of claim 12, further comprising:
returning the dynamic landing page to a web browser executed on a user computing device.

17. The method of claim 12, wherein injecting the at least one dynamic content block to the selected dynamic landing page further comprises configuring the widget to configure A/B testing among two or more dynamic landing pages based on a set of criteria, the set of criteria including a referrer uniform resource locator (URL), a user agent, a geographic location, time of day, a channel, a campaign, a page URL, or any combination thereof, comprising to:
provide a first dynamic landing page including a first dynamic content block or a second dynamic landing page including a second dynamic content block depending on whether the set of criteria is associated with a first set of criteria or a second set of criteria, respectively, the first dynamic content block being different from the second dynamic content block.

18. A non-transitory computer readable medium for storing computer instructions that, when executed by at least one processor causes the at least one processor to perform a method for dynamic landing pages, comprising:
selecting at least one content to be displayed in a dynamic landing page and which of at least two dynamic landing pages to display in response to a request for a destination Uniform Resource Indicator (URI) of a web site using a dynamic selector engine, wherein the selecting is based at least on information associated with the request for the destination URI;
injecting at least one dynamic content block to the selected dynamic landing page, the at least one dynamic content block including a widget configured to
re-rank a plurality of items displayed in the at least one dynamic content block from a previous display based on a set of criteria, the set of criteria including revenue generated, conversion rate, user preferences, user behavioral data, total views, a channel from which a visitor arrives at the dynamic landing page, or any combination thereof, comprising to:
select items of the plurality of items to be locked and shown in first N positions using a user interface, N being 1 or larger, wherein selected locked items are not refreshed; and refresh and display remaining unlocked items of the plurality of items in positions according to a re-ranking option; and returning the dynamic landing page using a proxy service.

19. The non-transitory computer readable medium recited in claim 18, wherein the dynamic landing page is a web page that is returned in response to the request for the destination URI, and wherein the web page includes customized content that is targeted for a campaign, channel, source, and/or user.

20. The non-transitory computer readable medium recited in claim 18, wherein the dynamic landing page is a web page that is returned in response to the request for the destination URI, and wherein the web page includes the widget that provides customized content for an online advertisement campaign that is associated with the destination URI to facilitate a targeted online advertisement campaign.

21. The non-transitory computer readable medium recited in claim 18, further comprising computer instructions for:
receiving the request for the destination URI of the web site from a referral URI, wherein the destination URI is associated with an online advertisement campaign.

22. The non-transitory computer readable medium recited in claim 18, further comprising computer instructions for:
returning the dynamic landing page to a web browser executed on a user computing device.

23. The non-transitory computer readable medium recited in claim 18, further comprising computer instructions for configuring the widget to configure A/B testing among two or more dynamic landing pages based on a set of criteria, the set of criteria including a referrer uniform resource locator (URL), a user agent, a geographic location, time of day, a channel, a campaign, a page URL, or any combination thereof, comprising to:
provide a first dynamic landing page including a first dynamic content block or a second dynamic landing page including a second dynamic content block depending on whether the set of criteria is associated with a first set of criteria or a second set of criteria, respectively, the first dynamic content block being different from the second dynamic content block.

* * * * *